US012530676B2

(12) United States Patent
Kostovski et al.

(10) Patent No.: US 12,530,676 B2
(45) Date of Patent: Jan. 20, 2026

(54) WEB-BASED WALLET AUTHENTICATION

(71) Applicant: DocuSign, Inc., San Francisco, CA (US)

(72) Inventors: John James Kostovski, Paris (FR); Mustafa Mert Gokce, Paris (FR)

(73) Assignee: Docusign, Inc., San Francisco, CA (US)

( * ) Notice: Subject to any disclaimer, the term of this patent is extended or adjusted under 35 U.S.C. 154(b) by 105 days.

(21) Appl. No.: 18/478,561

(22) Filed: Sep. 29, 2023

(65) Prior Publication Data

US 2025/0111356 A1 Apr. 3, 2025

(51) Int. Cl.
*G06Q 20/00* (2012.01)
*G06Q 20/36* (2012.01)
*G06Q 20/38* (2012.01)

(52) U.S. Cl.
CPC ..... *G06Q 20/3674* (2013.01); *G06Q 20/3829* (2013.01)

(58) Field of Classification Search
CPC ............ G06Q 20/3674; G06Q 20/3829; H04L 9/3271; H04L 63/0838; H04L 63/105; H04L 9/3228; H04L 9/3231; H04L 63/0823; H04L 63/0861; H04L 2463/082; H04L 9/3247; H04W 12/06; G06F 21/31; G06F 21/32
USPC ................. 705/16, 21, 59; 380/44, 262, 278
See application file for complete search history.

(56) References Cited

U.S. PATENT DOCUMENTS

| | | | |
|---|---|---|---|
| 10,037,352 B1* | 7/2018 | Dyer | ..................... G06F 16/282 |
| 2018/0101847 A1 | 4/2018 | Pisut, IV | |
| 2020/0259656 A1 | 8/2020 | Sundaresan et al. | |
| 2021/0211299 A1 | 7/2021 | Hussain | |
| 2021/0327007 A1* | 10/2021 | Han | ......................... H04L 9/50 |
| 2022/0286294 A1 | 9/2022 | Grobler | |

FOREIGN PATENT DOCUMENTS

CN 111400682 A 7/2020

OTHER PUBLICATIONS

International Search Report and Written Opinion of International Application No. PCT/US2024/047516 dated Nov. 11, 2024, 14 pp.

* cited by examiner

*Primary Examiner* — Dante Ravetti

(74) *Attorney, Agent, or Firm* — Shumaker & Sieffert, P.A.

(57) ABSTRACT

Techniques are described for the use and implementation of web-based wallet authentication. An example method includes receiving, by processing circuitry, a request from a computing device for a document package. The document package may include an electronic document and specify a name of a signatory for the electronic document. In response to a determination that the request is associated with a user account, the processing circuitry may initiate a passkey challenge to the computing device using a public key associated with the user account. Responsive to successful completion of the passkey challenge, the processing circuitry may configure the computing device to accept a signature corresponding to the name of the signatory specified for the electronic document. The processing circuitry may implement a document management platform which coordinates with a third-party identification verifier to verify the identity of the signatory and provides password-less authentication for a known signatory.

20 Claims, 8 Drawing Sheets

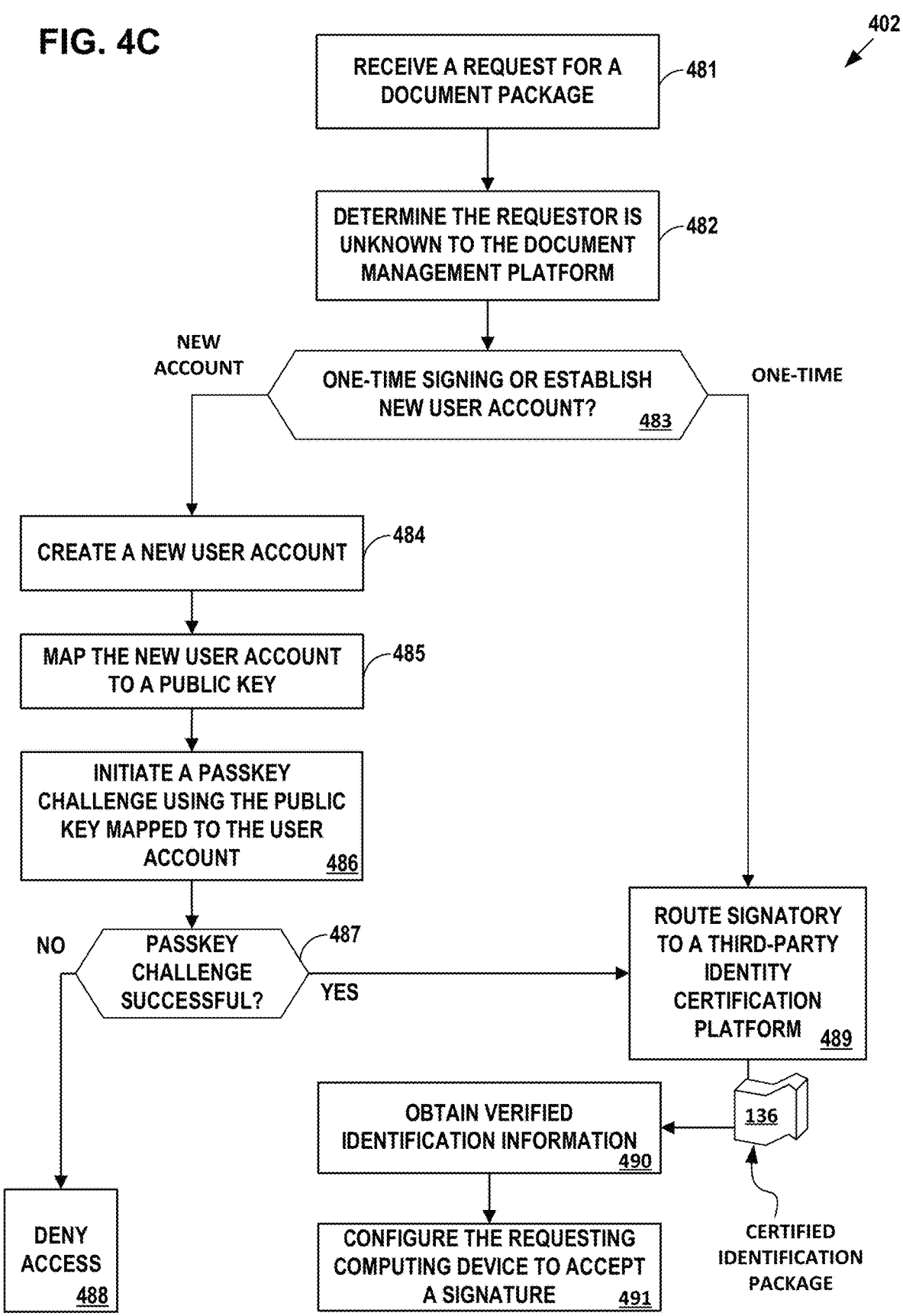

WEB-BASED WALLET AUTHENTICATION

TECHNICAL FIELD

This disclosure relates generally to electronic document management, and more specifically to the use and implementation of web-based wallet authentication.

BACKGROUND

Document management systems manage electronic documents for various entities (e.g., people, companies, organizations). Such electronic documents may include various types of agreements that can be executed (e.g., electronically signed) by entities, such as, for example, but not limited to, non-disclosure agreements, indemnity agreements, purchase orders, lease agreements, employment contracts, and the like. Document management systems may employ techniques to verify an identity of an entity before allowing the entity to interact with a document, such as to execute an agreement.

SUMMARY

Examples of the present disclosure describe techniques for the use and implementation of web-based wallet authentication by a document signer or signatory. The techniques described herein allow users to sign a document without relying on passwords, dedicated computer software applications, or specialized mobile apps to save the password. Moreover, the techniques allow users to sign multiple documents across multiple signing sessions without having to undergo identity verification for each and every signature applied or for every signing session. After processing circuitry has determined that an incoming request for an electronic document is associated with a user account, the processing circuitry responsively initiates a passkey challenge to the requesting computing device using a public key previously associated with the user account. Having the public key associated with the user account or otherwise mapped to the user account, allows the processing circuitry to utilize the public key for verifying the user account.

If an incoming request for an electronic document is not associated with a user account, the processing circuitry may be configured to transmit instructions to the requesting computing device to create the user account. If a public key is not mapped to the user account or the user account is new and therefore has not been mapped to a public key or otherwise associated with the public key, the processing circuitry may be configured to map the user account to a public key and record or maintain the mapping between the public key and the user account using a database system.

If a passkey challenge is not successfully completed, processing circuitry may deny access to the electronic document requested. However, in some examples, the processing circuitry may be configured to authenticate the user account and thus determine the public key mapped to the user account through alternative processing, such as issuing a biometric challenge or a two-factor authentication (2FA) request for a one-time use code, either or both of which may allow the user account to be identified, and thus, the public key associate with the user account to be identified.

After the user account has been verified using the public key by successfully completing the passkey challenge or through alternative processing such as responding to the 2FA challenge with a one-time use code, the processing circuitry may be configured to retrieve identification information for a signatory specified by name for the electronic document. Pre-authorization may be obtained by the processing circuitry from the signatory to save such identification information. Optionally, the identification information may be stored in an identity wallet associated with the user account. If there is no identification information stored for the signatory in association with the user account and there is no identity wallet having such identification information for the signatory in association with the user account, the processing circuitry may transmit instructions to the requesting computer device to provide identification information for verification. Optionally, with the signatory's consent and authorization, the identification may be stored for subsequent use with later signing sessions or additional electronic documents for the signatory. The processing circuitry may alternatively reroute the computing device to a third-party identity certification provider which performs identity verification with the signatory and returns verified or certified identity information for the signatory to the processing circuitry, allowing the signing process of the electronic document to be completed by the signatory. As before, the identification information obtained from the third-party identity certification provider may optionally be stored for later use with the consent and approval of the signatory to store the identification information.

In accordance with the techniques of the disclosure, a document management platform may be configured to perform operations including receiving, by processing circuitry, a request from a computing device for a document package, in which the document package includes an electronic document and specifies a name of a signatory for the electronic document. In response to determining that the request is associated with a user account, initiating, by the processing circuitry, a passkey challenge to the computing device using a public key associated with the user account. Processing circuitry may, responsive to successful completion of the passkey challenge, configure the computing device to accept a signature corresponding to the name of the signatory specified for the electronic document.

In some examples, the present disclosure describes a computing system having a storage device and processing having access to the storage device. The processing circuitry is configured to perform operations including: receiving, by processing circuitry, a request from a computing device for a document package, in which the document package includes an electronic document and specifies a name of a signatory for the electronic document. In response to determining that the request is associated with a user account, initiating, by the processing circuitry, a passkey challenge to the computing device using a public key associated with the user account. Responsive to successful completion of the passkey challenge, the processing circuitry may configure the computing device to accept a signature corresponding to the name of the signatory specified for the electronic document.

In some examples, the present disclosure describes a computer-readable storage medium having instructions that, when executed, configure processing circuitry of a computing system to perform operations including: receiving, by processing circuitry, a request from a computing device for a document package, in which the document package includes an electronic document and specifies a name of a signatory for the electronic document. In response to determining that the request is associated with a user account, the processing circuitry may initiate a passkey challenge to the computing device using a public key associated with the user account. Responsive to successful completion of the passkey challenge, the processing circuitry may configure the computing device to accept a signature corresponding to the name of the signatory specified for the electronic document.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

FIGS. 4A, 4B, and 4C are flow charts illustrating example modes of operation for a documentation platform to perform operations for web-based authentication, in accordance with techniques of this disclosure.

Like reference characters denote like elements throughout the text and figures.

DETAILED DESCRIPTION

Figure 1A:
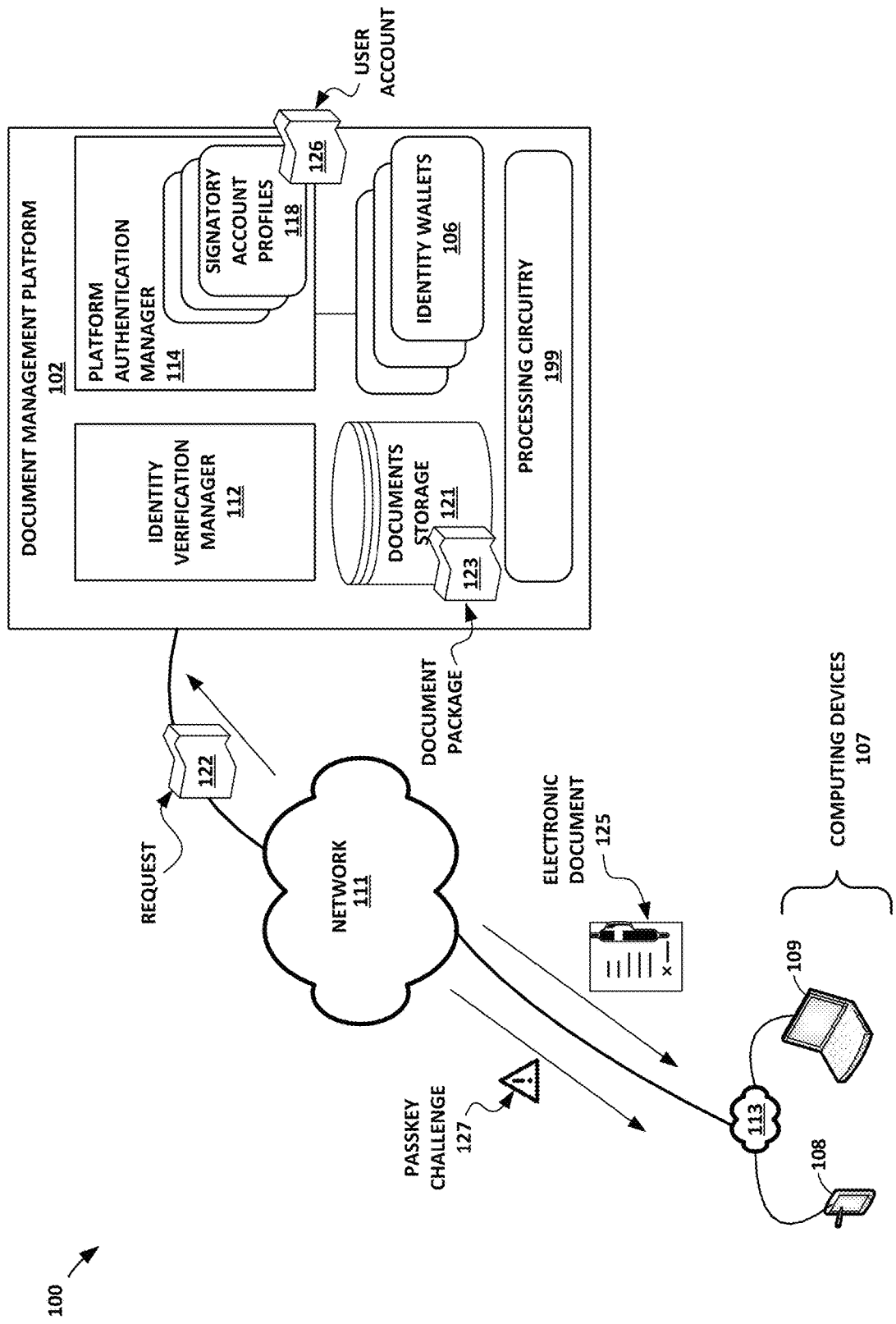
FIGS. 1A, 1B, and 1C are block diagrams illustrating example systems that implement web-based wallet authentication and perform operations utilizing web-based authentication, in accordance with one or more examples of the present disclosure.
Figure 1B:
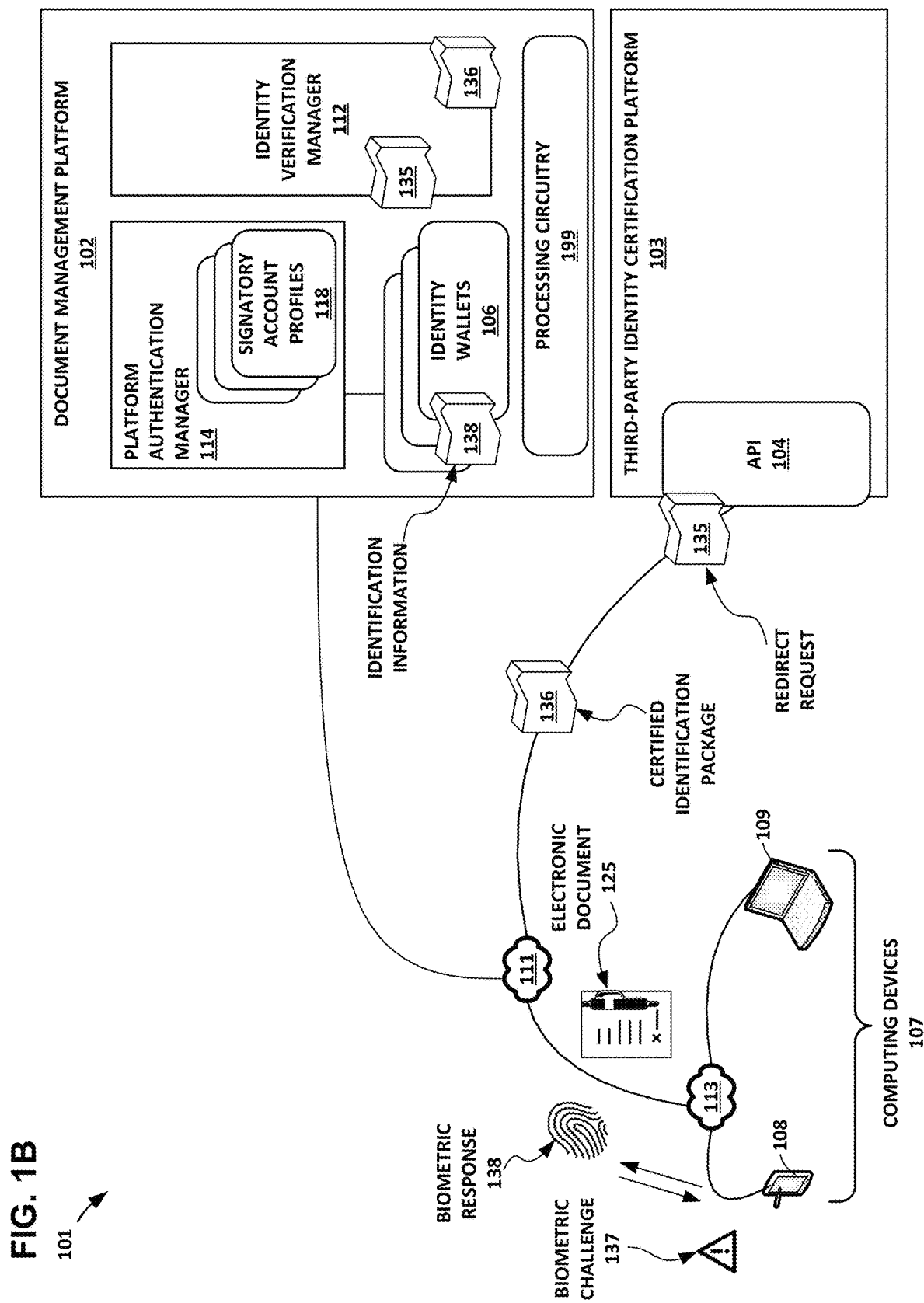
Figure 1C:
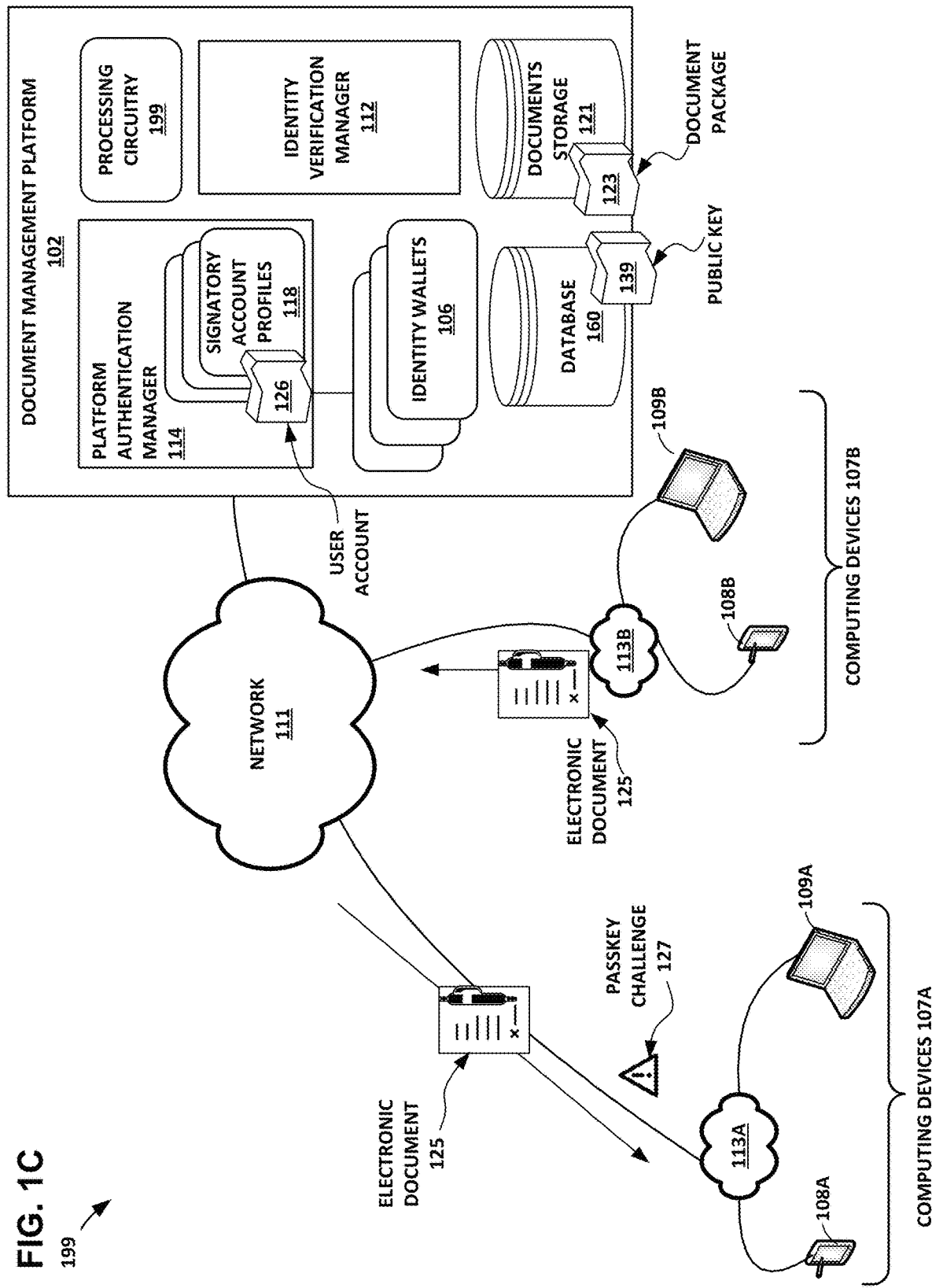

FIGS. 1A, 1B, and 1C are block diagrams illustrating example systems that implement web-based wallet authentication and perform operations utilizing web-based authentication, in accordance with one or more examples of the present disclosure. In the example of FIG. 1A, system 100 includes a centralized document management platform 102 that provides storage and management of electronic documents or document packages for various users. Document management platform 102 may include a collection of hardware devices, software components, and/or data stores that can be used to implement one or more applications or services provided to one or more computing devices 108 (e.g., mobile phones, smart phones, tablets, etc.) and one or more computing devices 109 (e.g., laptop computer, desktop computer, kiosk, etc.) via a network 113. The computing devices 107, which may include the computing devices 108 and 109, may communicate with the document management platform 102 via network 111, such as, for example, the public Internet.

The document management platform 102 may allow individuals and/or organizations to manage various types of electronic documents, including legal documents, contracts, and agreements. In some examples, the document management platform 102 may operate as an on-demand cloud-based service provider operating in the role of a host organization on behalf of subscribers. Customers and/or subscribers may apply an "eSignature" to an electronic document as a way to sign electronically from a variety of various computing devices. Some of the examples described herein may allow the document management platform 102 to accept signatures onto electronic documents in compliance with, for example, the US ESIGN Act and the European Union's eIDAS regulation, including EU Advanced and EU, Qualified Signatures. Some of the examples described herein may allow the document management platform 102 to provide upon request, or embed into the electronic documents, certified and auditable signatures in compliance with various jurisdictional regulations. The document management platform 102 may be configured to allow a sender to create and send documents to one or more recipients for negotiation, collaborative editing, electronic execution (e.g., electronic signature), automation of contract fulfillment, archival, and analysis, among other tasks.

Computing device 108 may be a smartphone, tablet, laptop computer, or some other portable computing device 107. Computing device 109 may be a desktop computer, workstation, kiosk, or some other computing device 107 largely configured to operate in non-portable manner. Collectively, each of computing device 108 and computing device 109 are computing devices 107 which in the example, shown here, are client facing computing devices utilized by a user requesting an electronic document and potentially signing such an electronic document. In some examples, the computing devices may similarly be utilized as an electronic document originator, or both an originator and a signer for an electronic document.

In some examples, a user of computing devices 108 and/or 109 may receive a notification of a document package (e.g., an envelope) specifying or containing an electronic document. Within the system environment, the user may review content or terms presented in a digital document, and in response to agreeing to the content or terms, the user may electronically sign the document. In some examples, in advance of the execution of the documents, the originator and/or sender of the electronic document may generate a document package to provide to the one or more recipients. The document package may include at least one electronic document to be executed by one or more recipients by specifying the name of the one or more recipients as a specified signatory for the electronic document. In some examples, the document package may also include one or more permissions defining actions the one or more recipients can perform in association with the document package. In some examples, the document package may also identify tasks the one or more recipients are to perform in association with the document package.

The document management platform 102 described herein may be implemented within a centralized document system, an online document system (e.g., a cloud system), a document management system, or any type of digital management platform. Although description may be limited in certain contexts to a particular environment, this is for the purposes of simplicity only, and in practice the principles described herein may apply more broadly to the context of any digital management platform. Examples may include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

The document management platform 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, healthcare software, or other types of applications or services. The applications or services may be provided as a service (-aaS) for SoftwareaaS, Platform-aaS, Infrastructure-aaS, Data Storage-aas (dSaaS), or other type of service.

Network 111 provides a communications path between the computing devices and the document management platform 102 and may operate over a public Internet or a private or semi-private network variation such as an Intranet or Virtual Private Network (VPN), etc. In the example of FIG. 1A, the document management platform 102 may enable computing devices 108 and/or 109 to access documents, via network 111 using a communication protocol, as if such document was stored locally (e.g., to a hard disk of a corresponding device 108, 109). Example communication protocols for accessing documents and objects may include, but are not limited to, Server Message Block (SMB), Network File System (NFS), or AMAZON Simple Storage Service (S3).

The document management platform 102 may include a database of identity wallets 106 that may be stored on one or more storage devices. The storage devices may represent one or more physical or virtual computers and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support the document management platform 102. In some examples, document management platform 102 may communicate with user devices (e.g., the sender device 108B, 109B or the recipient device 108,109) over the network 113 to receive instructions and send document packages (or other information) for viewing on user devices.

Each of networks 113 and network 111 may include the Internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client facing computing devices or systems and one or more computer/server/storage devices or systems). Each of the devices or systems illustrated in FIGS. 1A, 1B, and 1C may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A, 1B, and 1C or otherwise on network 113 and/or network 111 may be in a remote location relative to one or more other illustrated devices or systems.

Data exchanged over the network 113 and/or network 111 may be represented using any suitable format, such as hypertext markup language (HTML), extensible markup language (XML), or JavaScript Object Notation (JSON). In some examples, the network 113 and/or network 111 may include encryption capabilities to ensure the security of documents. For example, encryption technologies may include secure sockets layers (SSL), transport layer security (TLS), virtual private networks (VPNs), and Internet Protocol security (IPsec), among others.

Document management platform 102 may verify the identity of one or more recipients to perform one or more actions in relation to a document package, such as executing an agreement, accessing a document, modifying a document, or any other suitable action. In particular, the document management platform 102 may perform account verification of a signatory account profile 118 for a document signer via the platform authentication manager 114.

Processing circuitry 199 of the document management platform 102 may be configured for receiving, by the processing circuitry 199, a request 122 from a computing device 107 for a document package 123. For example, processing circuitry 199 may receive a request for the document package 123. Processing circuitry may retrieve the document package 123 from the documents storage 121 component, such as a database system or other electronic storage system accessible to the document management platform 102. The document package 123 may include an electronic document 125 and may specify a name of a signatory for the electronic document 125. In response to determining that the request is associated with a user account 126, the processing circuitry 199 may initiate a passkey challenge 127 to the computing device 107 using a public key associated with the user account 126. Platform authentication manager 114 may store the user account 126 within the signatory account profiles 118. Processing circuitry 199 may determine that the request is associated with a user account 126 based on the signatory account profile 118. Responsive to successful completion of the passkey challenge 127, the processing circuitry 199 may configure the computing device 107 to accept a signature corresponding to the name of the signatory specified for the electronic document 125.

If there is no user account 126 already established for the originator of the request 122, the document management platform 102 may determine that a specified document signer is not associated with an existing signatory account profile 118 or the document management platform 102 may determine the request is not associated with any existing user account 126. In response to determining there is no user account 126 already established or determining there is no existing signatory account profile 118, or both. The document management platform 102 may facilitate the creation of a user account 126 for the signatory of the electronic document 125 as specified by the document package. The envelope or document package 123 containing the electronic document may additionally specify name data for a signatory and an email for the signatory, therefore, the document management platform 102 may be able to communicate with the signatory via email and by name, despite the lack of any associated user account or signatory account profile 118 for the named signatory. The recipient of the email may be specified as the signatory and requested document signer for an electronic document 125 within the document package 123. The identity verification manager 112 may perform one or more name matching operations based on the name data provided by a sender of the document or the name of a specified recipient. The identity verification manager 112 may match the recipient's name to an existing signatory account profile 118 or user account 126 stored among the signatory account profiles 118 and responsively prompt the computing device 107 to authenticate into the document management platform 102 via the platform authentication manager 114 using known authentication credentials for the identified user account 126 or signatory account profile 118. Where the name matching operations by the identity verification manager 112 are unsuccessful or the specified recipient is unable to authenticate through the platform authentication manager 114 for a known signatory account profile, the document management platform 102 may instead facilitate creation of a new user account 126 or signatory account profile with the document management platform 102 on behalf of the named signatory identified as a signatory to the electronic document by the document package.

In the example of FIG. 1A, once the platform authentication manager 114 has authenticated the specified signer with a signatory account profile 118 or created a signatory user account profile 118 for the specified signer, the document management platform 102 may check for the existence of a pre-established identity wallet for the specified signer of the document. The document management platform 102 may store identification information for document signatories within identity wallets 106. Each identity wallet 106 may be uniquely linked with a single signatory account profile 118 managed by the platform authentication manager 114. The identity wallets 106 may store identity information for a document signatory at via storage accessible to the document management platform. The identity information stored within the identity wallets 106 may be maintained in an encrypted format.

In an example, a user of a computing device (e.g., the computing device 108, 109 sending or the computing device 108, 109 receiving) may represent an individual user, group, organization, or company that is able to interact with document packages (or other content) generated on or managed by the document management platform 102. Each user may be associated with a username, email address, full or partial legal name, or other identifier that may be used by the document management platform 102 to identify the user and to control the ability of the user to view, modify, execute, or otherwise interact with document packages managed by the document management platform 102. In some examples, users may interact with the document management platform 102 through a user account with the document management platform 102 and one or more user devices accessible to that user.

In the example of FIG. 1B, system 101 includes a centralized document management platform 102 that may provide storage and management of electronic documents or document packages for various users. Document management platform 102 may additionally interact with a third-party identity certification platform 103 to obtain a certified identification package 136.

In the example of FIG. 1B, the identity verification manager 112 may coordinate with a trusted third-party service provider such as, for example, the third-party identity certification platform 103. The third-party identity certification platform 103 may provide a redirect API 104, via which to receive redirect requests 135 initiated by the identity verification manager 112 of the document management platform 102. When an identity wallet 106 is not pre-established for a signatory specified by a document package (e.g., where a user declines to have their information stored and thus withholds consent), or in the event the named signer cannot authenticate with a user account among the signatory account profile 118 or the named signer's identification is no longer valid or is not properly certified, the document management platform 102 may re-direct 135 the recipient's computing device 108, 109 to perform identification certification via the third-party identity certification platform 103 which receives the redirection request 135 initiated by the document management platform 102 at the redirect API 104. The third-party identity certification platform 103 may perform identification verification of the named signatory signer by interacting with the recipient's computing device 108, 109 to establish that the identity of the named signatory matches identifying documents (e.g., passport, driver license, etc.). The third-party identity certification platform 103 may return a certified identification package 136 to the identity verification manager 112 operating at the document management platform 102.

In some examples, processing circuitry 199 may determine that the request 122 is associated with the user account 126. For instance, processing circuitry 199 may transmit to the computing device 107, instructions to issue a challenge 137 for biometric authentication input to be submitted to the computing device 107. The processing circuitry 199 may receive, from the recipient's computing device 107A, a successful response 138 to the challenge for biometric authentication input. Responsive to receiving the successful response 138 to the challenge 137 for biometric authentication input, the processing circuitry 199 may decrypt identification information 138 from an identity wallet 106 associated with the user account 126 for identity verification of the signatory.

The processing circuitry 199 may transmit to the computing device the instructions to issue the challenge 137 for biometric authentication input to be submitted to the computing device. For example, processing circuitry 199 may transmit the instructions to the computing device 107 to obtain the biometric authentication input using native biometric challenge 137 functionality of a web-browser executing at the computing device 107. The biometric challenge 137 for biometric authentication input may use a biometric user interface to unlock the computing device 107.

The document management platform 102 may configure the computing device to accept the signature corresponding to the name of the signatory specified for the electronic document. For example, processing circuitry 199 may automatically populate at least a portion of the identification information 138 decrypted from the identity wallet 106 associated with the signatory into the electronic document 125 prior to configuring the computing device to accept the signature.

The document management platform 102 may include an identity verification manager 112 that may provide verification of an identity of the user of the recipient's computing device 108, 109 to execute a received electronic document 125 by applying their signature to the electronic document as the named signatory specified by the document package and as configured by the document originator. The document management platform 102 may include a platform authentication manager 114 that may perform authentication of named document signers and document signatories that are known, a priori, to the document management platform 102. For example, identity verification manager 112 may correlate a known document signer specified by a document package with a signatory account profile 118 using an identity document. Examples of an identity document may include, but are not limited to, a driver's license, a passport, or other form of government issued identification. For example, the identity verification manager 112 may obtain an image of the identity document to provide to the document management platform 102, such as by using a camera component of the recipient's computing device 108, 109 to capture the image. In some examples, the identity verification manager 112 may process the image of the identity document to extract identity information (e.g., a second name, date of birth, passport number, driver's license number, etc.) of the user, which may be referenced against corresponding information stored within the known signatory account profiles 118.

The third-party identity certification platform 103 may optionally store identity information for the named signer and user of the recipient's computing device 108, 109, for example, via a private or governmental database storing identity information corresponding to one or more individuals. As shown here, the recipient's computing device 108, 109 may obtain identity data (e.g., a certified identity) from the trusted service provider (e.g., via identification certification manager 113) for use in creating the certified identification package 136 or the recipient's computing device 108, 109 may provide identity data to the third-party certification platform 103 (e.g., via identification certification manager 113) for use in creating the certified identification package 136, or some combination of both.

In response to obtaining and successfully performing identification verification of the named signer and user of the recipient's computing device 108, 109, the identification certification manager 113 may return the certified identification package 136 back to the identification verification manager AC 112, for instance, by transmitting the certified identification package 136 via a public Internet, such as network 111.

Processing circuitry 199 may determine that the request is associated with the user account by transmitting to the computing device an authentication request for a one-time use two-factor identification (2FA) code. For example, processing circuitry 199 may obtain, from the computing device, the one-time use 2FA code. For instance, as an added precaution, and in support of password-less authentication, the document management platform 102 may be configured to transmit a one-time use code via some communication channel to the user or signatory seeking to authenticate. Use of 2FA authentication via a one-time use code may enhance security and/or permit password-less authentication. For example, the processing circuitry 199 may transmit a one-time use 2FA code to an email address known to the document management platform, to a cellular phone number via a Short Messaging Service (SMS) text known to the document management platform, or the client facing computing device may be pre-configured within an authenticator which the signatory has established with the document management platform 102 previously, such that when prompted to enter the 2FA code, rather than having to enter a password, the user or signatory retrieves the one-time use 2FA code from their email, from their SMS messages, from their authenticator, or from whatever source they have established for the purposes of 2FA with the document management platform 102. Responsive to entry of the one-time use 2FA code at the user computing device, the signatory may be authenticated without having to enter a password. As described below, this may be combined with a challenge for biometric authentication input to be presented by a user.

In some examples, prior to configuring the computing device to accept the signature, the processing circuitry 199 may redirect the computing device 108 or 109 used by the signatory to a third-party identity certification platform 103 to capture identification information of the signatory for the electronic document 125. For instance, document management platform 102 may transmit a redirect request 135 to an API 104 hosted by the third-party identity certification platform 103.

In some examples, the document management platform 102 may be configured for obtaining, by the processing circuitry 199 from the third-party identity certification platform 103, a data package (e.g., depicted at FIG. 1B as the certified identification package 136) specifying the identification information of the signatory for the electronic document. In some examples, the document management platform 102 may be configured for obtaining, by the processing circuitry, pre-authorization from the signatory for the electronic document to store the identification information. Processing circuitry 199 may additionally store the identification information of the signatory within an identity wallet using an encrypted format.

In some examples, redirecting the computing device 107 to the third-party identity certification platform 103 may include requesting the third-party identity certification platform to independently perform identity verification operations for the signatory. For instance, the third-party identity certification platform 103 may perform one or more operations on behalf of the document management platform 102 such as, for example, validating passport information for the name of the signatory as specified by the document package using an optical scan of the passport information. Other validation operations may include, for example, validating authenticity of a passport having the name of the signatory as specified by the document package by detecting at least one of a passport hologram or a passport security marking, checking for presentation fraud to distinguish a real face of the signatory from a spoofed face presented to the third-party identity certification platform, and performing deep fake image detection by at least issuing a challenge to the signatory instructing the signatory to reorient their head into one or more positions specified by the third-party identity certification platform.

The document management platform 102 may bind verified or certified identification information to a specific signatory. For example, the document management platform 102 may, responsive to successful completion of one or more of the identity verification operations for the signatory by the third-party identity certification platform 103, bind the identification information output by the third-party identity certification platform 103 for the signatory to the name of the signatory as specified by the document package or otherwise bind the name of the signatory to the certified identification package 136 returned to the document management platform 102 by the third-party identity certification platform 103.

In the example of FIG. 1C, system 100 includes a centralized document management platform 102 that may provide storage and management of electronic documents or document packages 123 for various users. For example, such documents may be stored within documents storage 121 database or storage system. For example, the document management platform 102 may store electronic documents on behalf of user devices which originate an electronic document to be signed by a named signatory and user devices which receive the electronic document which is to be signed. Further depicted in FIG. 1C are computing device 108A and computing device 109A, each of which are configured in this example as computing devices 107A to receive an electronic document 125. Conversely, computing device 108B and computing device 109B, are each configured in this example as computing devices 107B to originate an electronic document 125. In some examples, the computing devices 107A and 107B may alter or swap their respective roles depending on what document needs to be signed and who is the named signatory for such a document.

In an example of FIG. 1C, a user of the sending and originating computing devices 108B and 109B which may be referred to collectively as computing device 107B or originating devices 107B. The originating devices 107B may create a document package at the originating device 107B and transmit the document package to the document management platform 102. The originating devices 107B may alternatively create the document package via a user interface output to the originating devices 107B during an authenticated session between the originating device 107B and the document management platform 102. The user of the recipient's computing device 108A, 109A may be associated with an email address provided by the user of the sender or originating device 107B. Such a document package may be configured to include an electronic document 125 and specify a name of a signatory for the electronic document 125. For example, the originator of the document package 123 may create a document requiring a signature by the signatory or may scan a physical paper document requiring the signature of the signatory so as to create a copy of the document in electronic form, resulting in the electronic document. The originator of the document package may additionally configure various information within the envelope or document package 123, such as specifying a name of the signatory (e.g., first name, last name, middle name, etc.) and specifying an email address for the signatory or a cellular telephone number for the signatory, or both.

The originator of the document package 123 may then submit the document package 123, as configured, to the document management platform 102. The document management platform may, in response to receiving the document package 123 from the originator, transmit the electronic document to the signatory, transmit the document package to the signatory, transmit a notification to the signatory indicating the document package is ready, transmit a link to the document package to the signatory, or some combination thereof. For example, the document management platform 102 may transmit a hyperlink to the signatory via the email address or via SMS message to the signatory using the contact email address and/or cellular phone number as configured within the document package 123 by the originator. In some examples, a signatory may view the document package 123 from the originator from a dashboard user interface within an authenticated session between the signatory and the document management platform. The document management platform 102 processes the request for the electronic document from the signatory and provides the electronic document or the document package 123 to the user computing device for review and execution by the user and signatory of the computing device 107A. Computing device 107A represents the recipient device for receiving the document package 123 allowing the user and signatory to review the electronic document. The computing device 107A may be either or both of computing devices 108A and 109A, accessible to the user and signatory that receives the electronic document for review.

The processing circuitry 199 may store the public key 139 into a database 160 system. For example, the document management platform 102 may record, by the processing circuitry 199 to the database system 160, an association between the public key 139 and the user account 126 (e.g., a mapping using a database). In such an example, processing circuitry 199 may determine whether the public key 139 is associated with the user account 126 based on the association between the public key 139 and the user account 126 recorded to the database system 160. For instance, the document management platform 102 may determine which public key specifically needs to be utilized to facilitate the passkey challenge to the computing device 107 seeking to authenticate with the document management platform.

In some examples, validating the authority of the signatory for the electronic document to sign the electronic document by initiating the passkey challenge may include performing, by the processing circuitry 199, a password-less authentication of the signatory for the electronic document via the successful completion of the passkey challenge. Stated differently, the document management platform 102 may fully authenticate a signatory which is to sign the electronic document entirely without prompting the signatory, computing device 107, or user of such a device for entry of their password. Because the public key 139 stored by the document management platform 102 is associated with the user account 126 and is utilized in creating the passkey challenge transmitted to the computing device 107 seeking to authenticate with the document management platform 102, successful completion of the passkey challenge, which relies the computing device 107 to have access to the private key, may be sufficient authentication.

In some examples, the processing circuitry 199 may be configured specifically for implementing the document management platform. In some examples, prior to determining that the request 122 received from the computing device 107 for the document package 123 is associated with the user account 126, the document management platform 102 may be configured for determining, by the processing circuitry, the signatory for the electronic document has not yet established the user account with the document management platform. In some examples, operations may include transmitting, by the processing circuitry, instructions to the computing device to instruct the signatory for the electronic document 125 to create the user account 126 with the document management platform 102.

For instance, the originator of the electronic document 125 (e.g., computing devices 107B) may create an electronic document for signature, specifying the name of the signatory and an email address for the signatory, without actually relying upon that signatory having any preexisting user account with the document management platform 102. In such an event, the specified signatory cannot authenticate with the document management platform 102, as that signatory has not yet created a user account, does not have a public key associated with such a user account via which to facilitate the passkey challenge, and cannot therefore successfully complete the passkey challenge. Nevertheless, the signatory may still be permitted to request 122 access to the electronic document, for instance, in reply to an email, if the signatory creates a user account, hence, the document management platform transmitting, by the processing circuitry, the instructions to the computing device to instruct the signatory for the electronic document 125 to create the user account 126. In some examples, a passkey challenge is not utilized or may be selectively bypassed by the signatory who declines to create a user account. In such situations, the signatory may still sign the electronic document 125 by attesting to, and verifying their identity, by some other means in compliance with applicable law for their jurisdiction.

In some examples, while not required, a signatory may choose to create a user account, as doing so may permit that signatory to sign multiple documents in a faster and more efficient manner, especially where the signatory has pre-authorized the document management platform 102 to store and re-use identification information associated with the signatory for the multiple documents. In some examples, such identification information may be provided directly to the document management platform 102 which stores such information on behalf of the signatory pursuant to the pre-approval or affirmative consent of the signatory. However, in certain jurisdictions, simply capturing and storing identification information is not sufficient. Rather, such information may be required, by law, to be certified. Therefore, in such instances, the document management platform 102 may coordinate with, or redirect the signatory to, a third-party identity certification platform 103 as described above, so as to capture relevant identification information of the signatory.

Regardless of the process by which such information is captured, once the signatory has consented or pre-authorized the document management platform 102 to store the identification information associated with the signatory at the document management platform 102, signing of electronic documents 125 by the signatory is more efficient for the user, as the document management platform 102 may be configured to both quickly authenticate the signatory as well as retrieve and pre-populate identification information associated with the signatory into various electronic documents needing to be signed, thus simplifying the actual act for the signatory of applying their signature to an electronic document. However, before the signatory seeking to participate in the more efficient signing process in which their identification information is stored by the document management platform 102 may utilize such a process, the signatory must first consent to having their information stored and configure their user account 126 in such a way that their information may be retrieved by the document management platform 102. For example, the document management platform 102 may configure the computing device to accept the signature corresponding to the name of the signatory specified by a second electronic document by initiating a second passkey challenge to the computing device. Responsive to successful completion of the second passkey challenge, the document management platform 102 may configure the computing device to accept the signature corresponding to the name of the signatory specified for the second electronic document. In such a way, the user may sign the second electronic document without having to login to the document management platform 102 repeatedly and without the signatory providing identification information repeatedly.

Pursuant to obtaining pre-authorization and consent from the user, the document management platform 102 may store the identification in a variety of formats, use a variety of encryption schemes, or may store the identification information in a variety of locations accessible to the document management platform 102, such as using a database system local to the document management platform 102, using a remote or cloud-based database system, or using a local or a remote datastore. Stated differently, the identification information need not be stored directly by the document management platform 102 and may instead be indirectly accessible to the document management platform 102.

The processing circuitry 199 may be configured to, prior to determining that the request received from the computing device 107 for the document package 123 is associated with the user account 126, obtain pre-authorization from the signatory for the electronic document 125 to store identification information about the signatory for the electronic document 125 at the document management platform 102.

Responsive to obtaining the pre-authorization from the signatory for the electronic document to store the identification information about the signatory for the electronic document at the document management platform, processing circuitry 199 may create an identity wallet associated with the user account at the document management platform. Processing circuitry 199 may encrypt the identification information about the signatory for the electronic document within the identity wallet associated with the user account in an encrypted format. Configuring the identity wallet may provide a mechanism by which the identification information for the signatory is stored and maintained in an encrypted format.

Assuming the signatory has pre-authorized the document management platform 102 to store such identification information and the signatory has a user account established and their identification information stored by the document management platform 102, subsequent signings by the signatory of electronic documents may utilize the more efficient process. For instance, a user named as a signatory may authenticate with the document management platform 102 in a fast, efficient, and wholly password-less manner through utilization of the passkey challenge (e.g., such as attesting to the user device their identity through confirmation of biometric input). Responsive to the successful completion of the passkey challenge, the user is authenticated, and because the document management platform 102 already has access to the identification information for the signatory corresponding to the user, the signatory's identification information may be pre-populated into the electronic document. Based on acceptance by the signatory, the signature of the signatory may be accepted into the electronic document, thus completing the process. For example, a signatory having to review and sign many documents may progress more efficiently through their workload by minimizing the overhead associated with signing such electronic documents, and instead, apply their focus and attention to the review and signing of such electronic documents. Stated differently, the operational costs of having to authenticate, login, populate relevant information, configure a signature, and apply a signature to an electronic document is significantly reduced.

The processing circuitry 199 may create the document package 123 using at least the electronic document 125 as received from a second computing device 107B and the name of the signatory as specified by the second computing device 107B. Processing circuitry 199 may transmit to the first computing device 107A, a notification indicating the electronic document 125 is ready to be signed.

In some examples, the document management platform 102 may configure the computing device 107 to accept the signature corresponding to the name of the signatory specified by a second electronic document by performing operations including: initiating, by the processing circuitry, a second passkey challenge to the computing device 107A. Processing circuitry 199 may, responsive to successful completion of the second passkey challenge, configure the recipient's computing device 107A to accept the signature corresponding to the name of the signatory specified for the second electronic document.

The processing circuitry 199 may transmit, to the computing device, instructions for creating and storing a private key at the computing device to respond to the passkey challenge. Subsequent to successful completion of the passkey challenge, processing circuitry 199 of the document management platform 102 may decrypt the identification information about the signatory previously stored at the document management platform 102 using the public key associated with the user account. Optionally, the identification information about the signatory for the electronic document stored at the document management platform 102 may be decrypted using the public key associated with the user account. In other examples, the identification information may not be encrypted and/or may be decrypted without using the public key associated with the user account. In some examples, processing circuitry 199 of the document management platform 102 may obtain the identification information about the signatory based on an event or other than successful completion of the passkey challenge, such as successful authentication, submission of a valid authentication token, successful completion of a 2FA login using a one-time use code, etc.

In some examples, processing circuitry 199 may apply a Public Key Infrastructure (PKI) compliant process for authenticating the computing device as part of the passkey challenge. Processing circuitry 199 may use a Fast Identity Online (FIDO) compliant private key storage protocol for authenticating the computing device as part of the passkey challenge. Processing circuitry of the user computing device may use a private key storage device communicatively interfaced with the user computing device for authenticating with the document management platform as part of the passkey challenge. Processing circuitry of the user computing device may use a secure digital wallet accessible to the signatory specified by the document package for authenticating with the document management platform as part of the passkey challenge. Processing circuitry of the user computing device may use a private key imported by the computing device from a second computing device associated with the signatory for authenticating the computing device with the document management platform as part of the passkey challenge.

In some examples, a signature may include an eIDAS regulation compliant signature. In some examples, a signature may include a Qualified Electronic Signature (QES) compliant signature. As discussed above, a PKI compliant process may be used for encryption and decryption. Similarly, the PKI compliant process may be utilized when performing the passkey challenge. Once configured, the signatory applies a Qualified Electronic Signature or "QES" compliant signatory or attestation to the document package completing the signing process for that named signatory. European Union regulatory compliance now specifies that a signatory needs to prove their identity every time. Therefore, in order to persist the identity, a 2FA authentication method may be utilized in combination with a PKI protocol to validate the identity of the user signing a document. This may additionally include decrypting identification information from the identity wallet for the signatory.

The user computing device may include functionality for executing a web-browser having capability for issuing the biometric challenge natively. Where such capabilities exist with the user computing device 107, the user need not download an app or install any software, beyond that which is already existing and pre-configured for their device. For instance, new capability for web browsers has been deployed by various hardware manufacturers that may natively store the private key within the web browser in support of the PKI process. Therefore, despite certain jurisdictions such as the United States not relying upon a Qualified Electronic Signature (QES) compliant signature, those locations may nevertheless utilize the processes described herein so as to benefit from password-less authentication and signing. In other jurisdictions, such as the EU, having possession of the Qualified Electronic Signature (QES) compliant signature for any signed electronic document will suffice to demonstrate regulatory compliance in the event of a compliance audit. According to some examples, use of the public key as part of the passkey challenge transmitted to the computing device 107 may be configured to automatically trigger a request for a private key stored locally on the computing device or stored via a USB key storage device, or via any FIDO compliant private key storage.

In some examples, a password-less authentication may rely on a successful completion of a passkey challenge which may force the user's computing device to prompt the user to unlock their device. Consequently, when the signatory clicks unlock on their device, the device may be configured to auto-launch a browser prompt to input biometrics, such as a face ID, a fingerprint ID, or any user configured biometric input sufficient to satisfy the user's computing device registered biometrics. Face Identification (Face ID) is a facial recognition system that allows users to provide biometric authentication captured from an optical or camera view of the user's face for unlocking a computing device, as well as providing authentication for making payments, accessing sensitive data, etc. Fingerprint identification (also known as Fingerprint ID and Touch ID) is an electronic fingerprint recognition feature that allows users to provide fingerprint based biometric authentication captured from a touch sensitive interface device for unlocking a computing device, as well as providing authentication for making payments, accessing sensitive data, etc.

Alternatively, the computing device may optionally provide a password to confirm identity. Regardless of the on-device authentication mechanism chosen, the configuration may trigger 2FA authentication which forces a request for a one-time code to be sent to the mobile device or whatever computing device is being utilized by the signatory attempting to authenticate. Once the signatory correctly responds to the biometric challenge and optionally the 2FA challenge, the signatory's computing device may be configured to accept the signature into the electronic document and the signatory may thus click to sign the document attesting they have accepted, executed, or otherwise signed the electronic document.

Separately, when a user accesses the document management platform 102 directly via a platform login, dashboard, app, or otherwise (e.g., as opposed to clicking on a link in an email) and that user tries to open an envelope or document package 123 for viewing, the web browser may indicate that the user already has an existing identity wallet stored at the document management platform, and thus, need only authenticate. In such a way, the user may log into the document management platform 102, open the electronic document, and in compliance with the QES signing regulation, the user may be asked to confirm identity once again. Because the user has the existing identity wallet and has already authenticated with the document management platform by logging in, another 2FA one-time use code will be sent to that signatory via a pre-configured communication channel (e.g., email, SMS, authenticator, etc.) and upon entry of the matching 2FA one-time use code, the user's identification information may be retrieved from the identity wallet accessible to the document management platform 102 and the user may attest to, sign, execute, or otherwise apply their signature to the electronic document in conformity with a Qualified Electronic Signature (QES) compliant signature. Notably, under eIDAS regulations, a QES has the same legal effect as a handwritten signature and is therefore recognized in all member states of the EU.

The document management platform 102 may transmit instructions to the computing device 107 to create a user account and optionally to create an identity wallet associated with the user account. The document management platform 102 may receive a request from the computing device 107 to create a user account and optionally to create an identity wallet associated with the user account. The document management platform 102 may receive as input from the computing device 107, configuration information and metadata which the document management platform uses to generate the user account and to optionally generate an identity wallet associated with the user account. The document management platform 102 may store the generated user account and the identification, if created, using a database system. Because the user account creation and creation of the identity wallet are only relied upon a single time for any given signatory, signing all subsequent documents by the same signatory is made much more efficient, especially where password-less authentication is utilized by a signatory or user of the computing device 107.

According to certain examples, identification information is optionally stored at the document management platform 102 in an encrypted format using the public key. The private key is only accessible to a single computing device, however, may be migrated using a passkey wallet, USB key storage, or other compatible private key repository employed by the signatory.

In certain examples, the document management platform 102 relies on pre-approval of the signatory to store and to retrieve the identification information associated with the signatory. In alternative examples, the document management platform 102 has access to the identity wallet but the identification information is encrypted and relies on the document management platform 102 to obtain approval or a key or a token from the signatory each time the identification information is to be decrypted and retrieved. In some examples, the security options are configurable by a signatory having established a user account and specified user preferences for their account.

Identification information, regardless of whether stored within the identity wallet or otherwise, may be organized and stored within a JSON file structure at the platform and optionally encrypted at the document management platform 102. In certain examples, the JSON file is signed or otherwise certified by a third-party identity certification platform 103 and also stored by the third-party identity certification platform 103. Optionally, each time the identification information is unlocked, the JSON file with name and details and a link to the pre-stored identification information is released by the third-party identity certification platform 103 to the document management platform 102. However, in other examples, the document management platform 102 has direct access to such information pursuant to pre-approval by the signatory to store such information.

When the third-party identity certification platform 103 is relied upon to either obtain the identification information or to certify the identity of the signatory, the document management platform may enforce a pre-established SLA or service-level-agreement for the third-party identity certification platform 103 to perform its identity verification operations. The transaction may be considered complete with the third-party identity certification platform 103 returns a package in the form of the JSON file to the document management platform specifying the requisite identification information and certification for the signatory.

The third-party identity certification platform 103 may employ various techniques to validate an attested identity is authentic. For instance, the third-party identity certification platform 103 may perform a random challenge to avoid deep fakes or to defeat a stored video playback attack and to otherwise avoid spoofing. Similarly, once validation is completed by the third-party identity certification platform 103, the third-party identity certification platform 103 may permanently bind the person being authenticated (e.g., the signatory) with the presented identification document itself (such as a passport or government identification). For instance, when people turn their heads in reality, more facial information is presented than with a face-forward view. Notwithstanding the capabilities of modern AI, so called deep fakes are nevertheless poor at replicating the turned head view and may therefore be thwarted by the third-party identity certification platform 103 in a spoofing attack. Another challenge available to the third-party identity certification platform 103 is to position a dot/circle on the screen and request the person seeking to verify their identity to move their head away from the challenge dot, which again, even modern AI struggles to successfully respond to and may therefore be thwarted in a spoofing attack.

The third-party identity certification platform 103 may certify that the person evaluated corresponds to an acceptable identification document. The third-party identity certification platform 103 may generate as an output, a certification or a data package with the identification in a format bound to the certification. The document management platform may receive as input, the output from the third-party identity certification platform 103 certifying the identification information. The document management platform 102 may optionally embed a digital certificate into the electronic document at the time the signature is applied to or otherwise accepted into the electronic document. The embedded digital certificate provides some assurance, or otherwise certifies to anyone evaluating the electronic document later, that the signatory has attested to signing the document and is certified as being the same person as identified by the acceptable identification document (e.g., passport, government identification, etc.).

As used herein, document liveness detection refers to the verification that a document presented remotely is authentic and real. This is necessary to verify people, detect forgeries, as well as prevent potential digital crime. There are various types of fraud that involve fake document usage online which is the purpose for the third-party identity certification platform 103 validating and certifying the identification information presented.

Signatory refers to a person who signs a document or an electronic document and is subject to the document themselves as an individual, or a person who has signed a document or an electronic document such as a treaty or contract for an organization, state, etc., on whose behalf such a document has been signed. For example, a signer and a co-signer on a mortgage loan are both signatories as mortgagees (e.g., borrowers). A representative for the lending institution may act on behalf of the lending institution as a signatory for the mortgagor (lender).

Deepfakes are synthetic media that have been digitally manipulated to replace one person's likeness convincingly with that of another. Deepfakes are the manipulation of facial appearance through deep generative methods. While the act of creating fake content is not new, deepfakes leverage powerful techniques from machine learning and artificial intelligence to manipulate or generate visual and audio content that can more easily deceive. The main machine learning methods used to create deepfakes are based on deep learning and involve training generative neural network architectures, such as autoencoders, or generative adversarial networks (GANs).

JavaScript Object Notation or "JSON" is an open standard file format for sharing data that uses human-readable text to store and transmit data. JSON files are stored with the *.json extension. JSON uses less formatting and is a good alternative for XML.

A Qualified Electronic Signature or "QES" is a type of an Advanced Electronic Signature "AdES" based on a qualified certificate and created by a Qualified Electronic Signature Creation Device "QSCD." Under eIDAS regulations, a compliant AdES must uniquely identify and link its signatory to the electronic signature. A signatory must have sole control of the keys used to create the electronic signature. A compliant AdES must identify if the data has been tampered with after signing and invalidate the signature if data has been altered. The Qualified Electronic Signature (QES) is an AdES plus a qualified certificate which is only issued by a certified qualified trust services provider (QTSP) attesting to the authenticity of the electronic signature through proof of signer identity. In addition, a QES needs to be created within a trustworthy environment (QSCD) using specific software and hardware that ensures:

So called Fast IDentity Online (FIDO) authentication security keys are small devices that enable secure login to websites and web applications. They are one solution to the problem of weak passwords, phishing scams, hacking and keyloggers.

Figure 2:
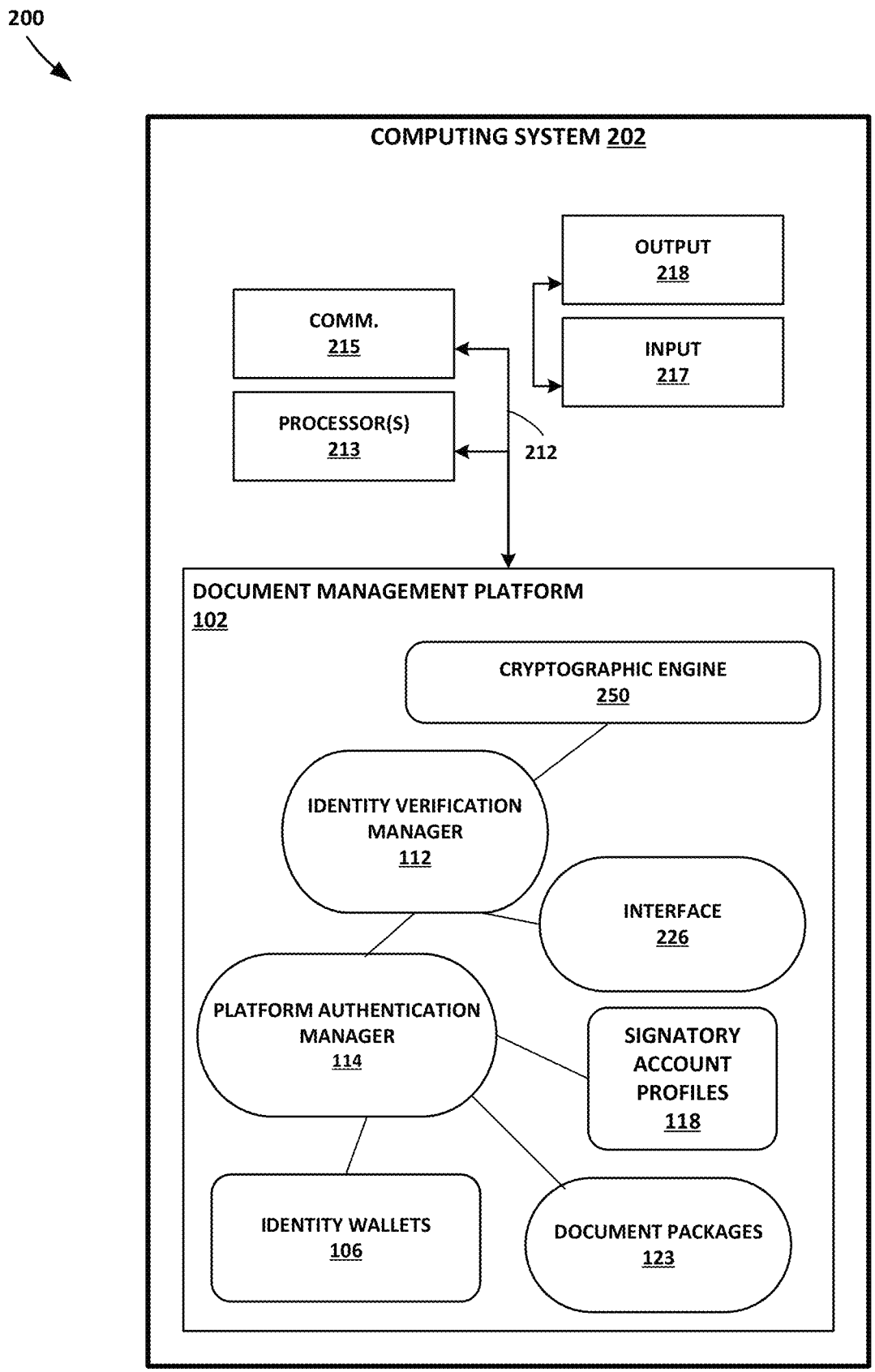
FIG. 2 is a block diagram illustrating an example system, in accordance with techniques of this disclosure.

FIG. 2 is a block diagram illustrating an example system, in accordance with techniques of this disclosure. In the example of FIG. 2, computing system 202 may include one or more communication units 215, one or more input devices 217, one or more output devices 218, and the document management platform 102.

The document management platform 102 may include a cryptographic engine 250 for use in encrypting information and decrypting information. The cryptographic engine 250 may facilitate the passkey challenge by providing or generating an encrypted data block which is transmitted to the computing device for decrypting using a private key as part of the passkey challenge. The cryptographic engine 250 may additionally perform the comparison of information returned by the computing device to the document management platform with information used as an input into the encrypted data block. For example, unencrypted data which is used by the cryptographic engine 250 to create the encrypted data block may be compared with decrypted information returned to the document management platform as part of the passkey challenge.

In some examples, the document management platform 102 may be configured for validating, by the processing circuitry, authority of the signatory for the electronic document 125 to sign the electronic document by initiating the passkey challenge 127 to the computing device 107 using the public key 139 associated with the user account 126. In some examples, initiating the passkey challenge may include one or more of the following operations: encrypting, by the processing circuitry, an unencrypted block of data using the public key associated with the user account to generate an encrypted block of data. Processing circuitry (e.g., processor(s) 213) may transmit the encrypted block of data to the computing device 107 with a request for the computing device to extract a recovered block of data from the encrypted block of data using a private key accessible to the computing device 107. Processing circuitry may obtain a response from the computing device including the recovered block of data. Processing circuitry may determine successful completion of the passkey challenge 127 based on a comparison of the unencrypted block of data with the recovered block of data.

The document management platform 102 may include interface module 226, identity verification manager 112, platform authentication manager 114, one or more user accounts 126 or signatory account profiles 118, identification data stored within identity wallets 106, and electronic documents stored within document packages 123. One or more of the devices, modules, storage areas, or other components of computing system 202 may be interconnected to enable inter-component communications (e.g., physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213, also referred to herein as "processing circuitry 213", of computing system 202 may implement functionality and/or execute instructions associated with computing system 202 or associated with one or more modules illustrated herein and/or described below. In some examples, one or more processors 213 may be, may be part of, and/or may include processing circuitry that performs operations described herein. Examples of processors 213 include microprocessors, application processors, display controllers, auxiliary processors, one or more sensor hubs, and any other hardware configured to function as a processor, a processing unit, or a processing device. In some examples, computing system 202 may use one or more processors 213 to perform operations described herein, using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include, but are not limited to, a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more processors 213 may provide an operating environment or platform for various modules described herein, which may be implemented as software, but may in some examples include any combination of hardware, firmware, and software. One or more processors 213 may execute instructions of one or more modules. The processors 213 may retrieve, store, and/or execute the instructions and/or data of one or more applications, modules, or software. Processors 213 may also be operably coupled to one or more other software and/or hardware components, including, but not limited to, one or more of the components of computing system 202 and/or one or more devices or systems illustrated as being connected to computing system 202.

The document management platform 102 may perform functions relating to storage and management of documents or document packages (e.g., envelopes) for various users, as described above with respect to FIGS. 1A, 1B and 1C. The identity verification manager 112 may provide verification of an identity of the user of the recipient's computing device 108A, 109A having the role of a signatory for an electronic document. The identity verification manager 112 may interact with and/or operate in conjunction with one or more modules of computing system 202, including the interface module 226 and the platform authentication manager 114.

The platform authentication manager 114 may perform operations to authenticate that a request from a computing device for a document package is associated with a user account. Where no such user account exists, the platform authentication manager 114 may transmit instructions to the requestor to create a user account. The platform authentication manager 114 may perform operations to retrieve a requested document package 123 and pre-populate or automatically populate identification information for the signatory into the electronic document from identification information or an identity wallet 106 stored by the document management platform. Where the identification information or the identity wallet 106 does not exist for the signatory, the platform authentication manager 114 may transmit instructions to the requestor to create a provide their identification information, to reroute through a third-party identity certification platform 103 to capture, validate, and certify the signatory's identification information, as well as obtain the signatory's permission to store the identification information in a manner accessible to the document management platform for use with signing additional electronic documents bearing the same name corresponding to the signatory, as described above with respect to FIGS. 1A, 1B, and 1C.

The data store having the document packages 123 stored therein may be a file storage system, database, set of databases, or other data storage system storing information associated with document envelopes and electronic document packages. A user of the computing device 108B (see FIG. 1C) may provide a document package to a user of the computing device 109A (a recipient of the document package as shown at FIG. 1C) via envelopes. A document envelope (also referred to as a document package herein) may include at least one electronic document for execution. The at least one electronic document may have been previously negotiated by a sender and a recipient. And, as such, the document may be ready for execution upon the creation of an envelope. The document package may also include recipient information and document fields indicating which fields of the document need to be completed for execution (e.g., where the recipient should sign, date, or initial the document). The recipient information may include contact information for a recipient (e.g., a name and email address).

Interface module 226 may execute an interface by which other systems or devices may determine operations of identity verification manager 112 or platform authentication manager 114. Another system or device may communicate via an interface of interface module 226 to specify, retrieve, or otherwise identify a user account or a signatory account profile 118.

The interface module 226 may execute and present an API. The interface presented by interface module 240 may be a gRPC, HTTP, RESTful, command-line, graphical user, web, or some other interface.

In some examples, a system, having therein processing circuitry and a storage device is configured such that the processing circuitry, having access to the storage device, is enabled to: receive, by the processing circuitry, a request from a computing device for a document package, in which the document package includes an electronic document and specifies a name of a signatory for the electronic document. In response to a determination that the request is associated with a user account, the processing circuitry may initiate a passkey challenge to the computing device using a public key associated with the user account. Responsive to successful completion of the passkey challenge, the processing circuitry may configure the computing device to accept a signature corresponding to the name of the signatory specified for the electronic document.

Figure 3:
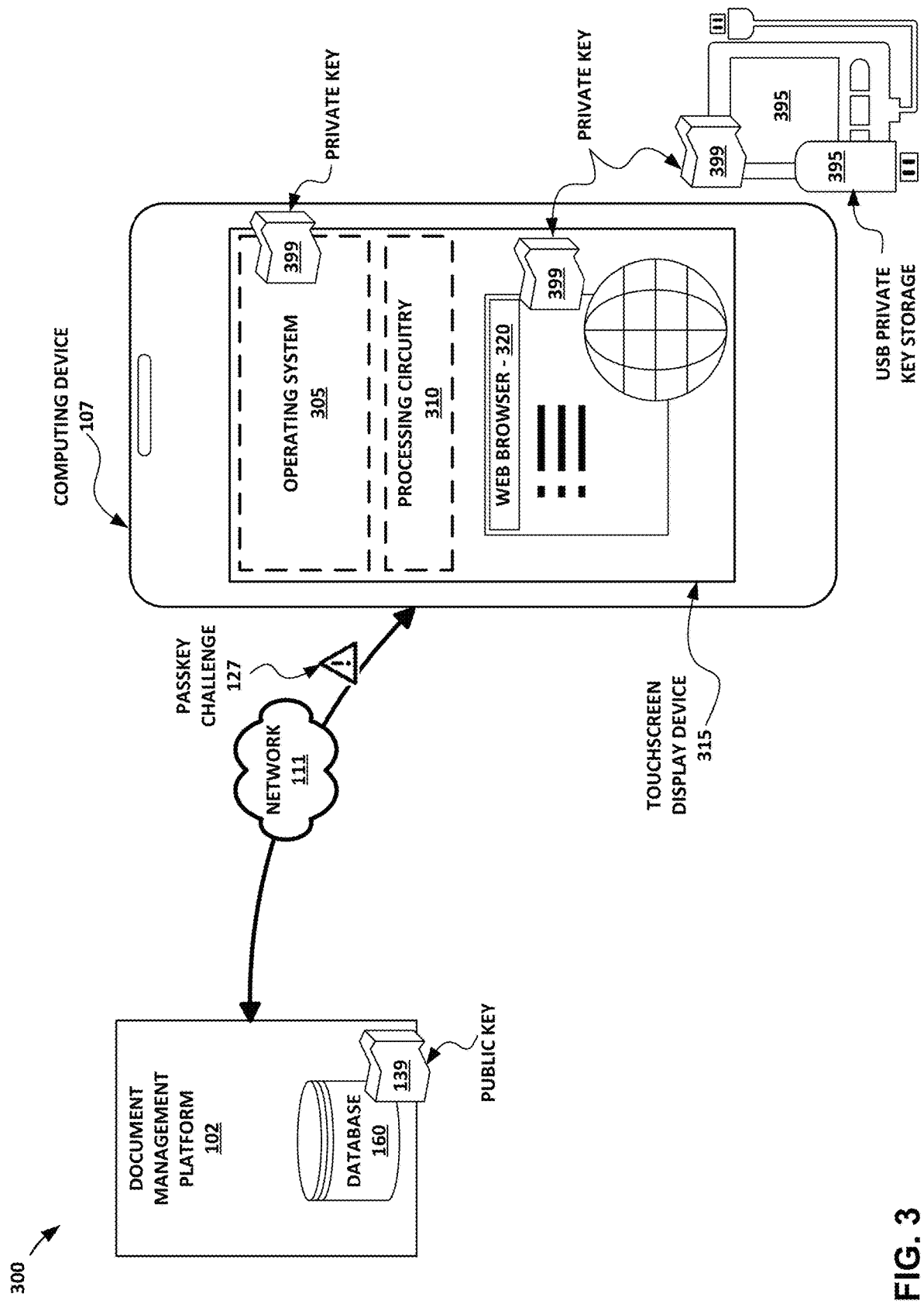
FIG. 3 is a block diagram illustrating an example computing device, in accordance with techniques of this disclosure.

FIG. 3 is a block diagram illustrating an example computing device, in accordance with techniques of this disclosure. As shown here, document management platform 102 communicates with the computing device 107 over a network 111. Document management platform 102 may include database 160 to store and record information, including recording the mapping of a public key 139 to a user account.

Computing device 107 may be a mobile computing device such as a smartphone, tablet, or laptop. Similarly, computing device 107 may be a desktop computer, personal computer (PC) or the like. Depicted here within computing device 107 is processing circuitry 310 which may include a set of one or more processors and a memory for storing instructions to be executed by the set of the one or more processors. Further depicted within computing device 107 is an operating system 305. Operating system 305 executes via the processing circuitry and may also be configured to execute native and non-native software and applications for computing device 107. Operating system 305 may output information for display to a user via the touchscreen display device 315 which provides both a user output interface as well as a user input interface.

As shown, a web browser 320 is output for display by the operating system executing via the processing circuitry 310 and allows a user to interact with the computing system 107. Web browser 310 may be a native web browser installed by default with the computing device or otherwise provisioned by default to the computing device 107. Other examples include non-native web browsers which are installed or configured for the computing device 107, but are nevertheless unaffiliated with the document management platform 102 and permit the computing device 107 to access, display, and interface with any public facing website.

As discussed previously, the document management platform 102 may issue a passkey challenge 127 to the computing device 107 in response to the computing device 107 requesting a document package or an electronic document within such a document package. The computing device may rely upon a private key 399, accessible to the computing device 107, to satisfy the passkey challenge 127. For example, the computing device may demonstrate possession of the private key to the document management platform by decrypting a challenge block of data previously encrypted by the document management platform 102 utilizing the public key 139 associated with the computing device 107. The document management platform 102 may validate completion of the passkey challenge by comparing a copy of the data block prior to encryption with a copy of the data block after having been decrypted by the computing device using the public key 139 and returned by the computing device as part of the passkey challenge 127.

The document management platform 102 may employ the use of Public Key Infrastructure (PKI) for authenticating users and devices by verifying that a particular cryptographic key belongs to a particular user or device. The key may be used as an identity for the user as part of an authentication scheme. In some examples, the private key 399 may be stored by the computing device 107 directly, including via a hardware security module (HSM) or an Encryption Key Management device specifically configured into the computing device 107 for storing cryptographic keys. In some examples, the private key 399 is stored by the operating system 305. In some examples, the private key 399 is stored within the web browser 320 or within a native web browser of the computing device 107. In some examples, the private key 399 is stored within a USB private key storage 395 device or USB private key storage 395 locker which is connected with the computing device via a peripheral communications bus by a user when access to the private key 399 is appropriate. In other examples, the private key 399 may be migrated from a first computing device 107 associated with a user to another computing device 107 accessible to the user. In some examples, the private key 399 may be stored within a wallet accessible to the user and accessed by the user for use with completing the passkey challenge 127.

Regardless of the manner of storage of the private key 399, the document management platform 102 allows a user of the computing device to sign an electronic document without having to download or install any software application or dedicated apps associated with the document management platform 102. The user of the computing device 107 is able to sign electronic documents via a native web browser or generic web browser 320 unaffiliated with the document management platform 102 by having the private key 399 stored at the operating system 305 of the computing device 107 or via the web browser 310 of the computing device 107 or in a manner in which the private key 399 is accessible to the user via the computing device 107. In some examples, the computing device 107 authenticates with the document management platform 102 by relying upon successful completion of the passkey challenge 127, which may be performed in its entirety without a user of the computing device ever typing or entering a password into the computing device, thus allowing for password-less authentication of the computing device 107 with the document management platform 102.

Figure 4A:
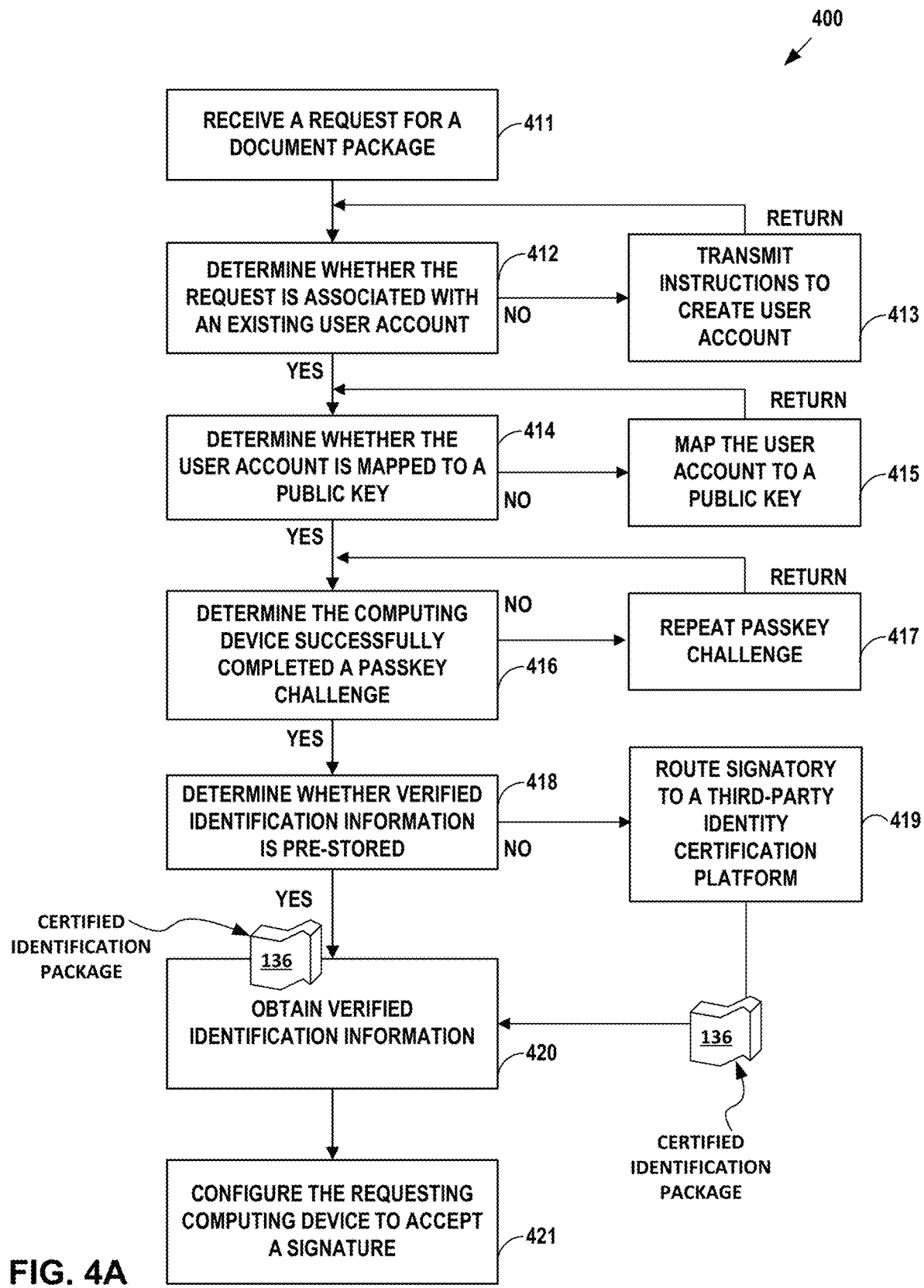
Figure 4B:
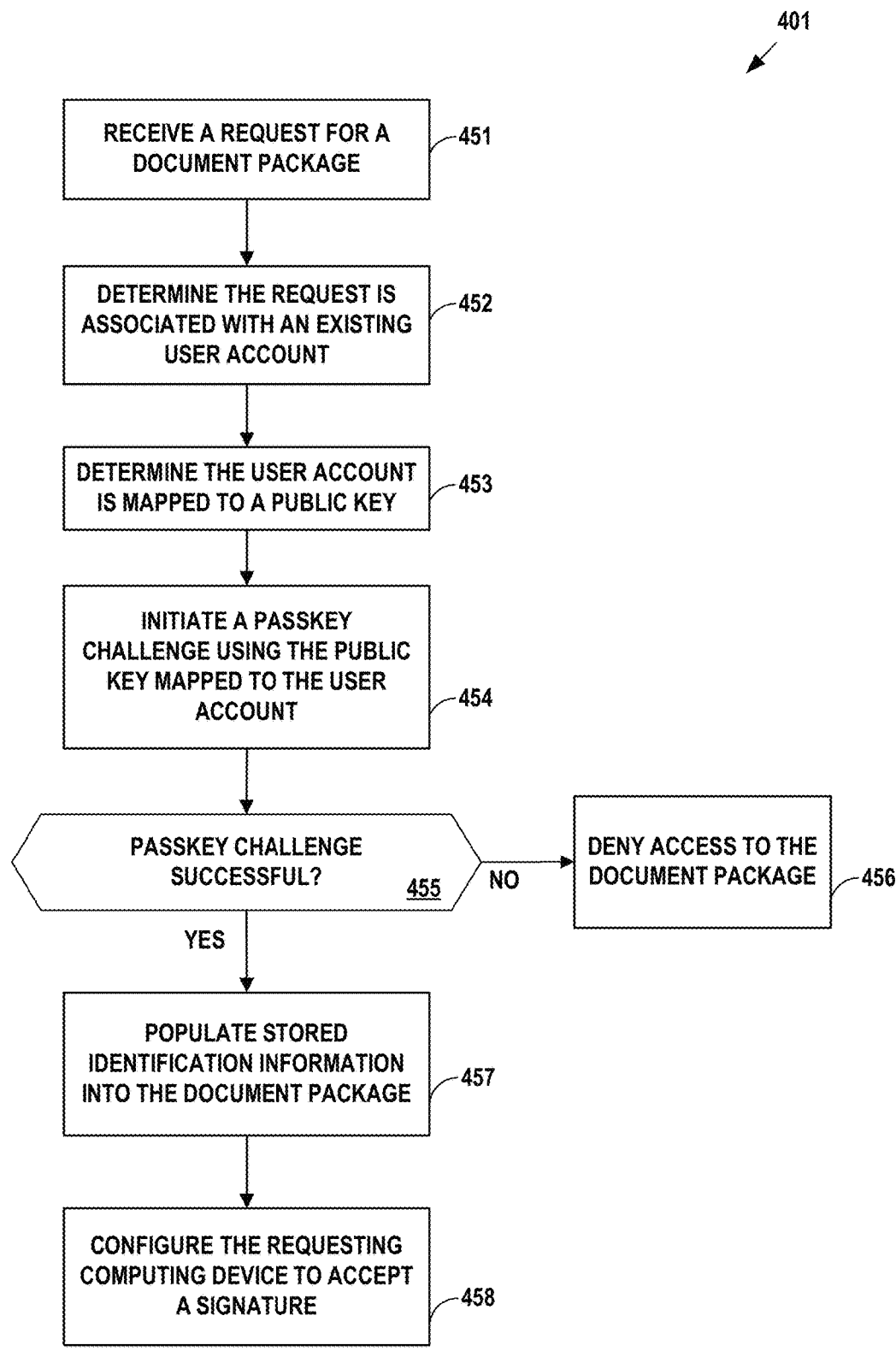

FIGS. 4A, 4B, and 4C are flow charts illustrating example modes of operation for a documentation platform to perform operations for web-based authentication, in accordance with techniques of this disclosure. Modes of operation 400, 402, and 403 are described with respect to the document management platform 102 and FIGS. 1A, 1B, 1C, and 2. The computing device 107 of FIG. 3 may interact with a document management platform 102 performing the modes of operation 400, 402, and 403 as set forth by FIGS. 4A, 4B, and 4C.

The document management platform 102 may allow a sender to create and send documents to one or more recipients for negotiation, collaborative editing, electronic execution (e.g., electronic signature), automation of contract fulfillment, archival, and analysis, among other tasks. In one non-limiting example, a user of the computing devices 107B (see FIG. 1C) may be a sender of a document package and a user of the computing devices 107A (see FIG. 1C) may be a recipient of the document package. In some examples, in advance of the execution of the documents, the sender may generate a document package to provide to the one or more recipients. The document package may include at least one document to be executed by one or more recipients. In some examples, the document package may also include one or more permissions defining actions the one or more recipients can perform in association with the document package. The document package may also include recipient information and document fields indicating which fields of the document need to be completed for execution (e.g., where the recipient should sign, date, or initial the document). The recipient information may include contact information for a recipient (e.g., a name and email address). The recipient's name provided by the sender is referred to hereinafter as first name. At 501, the document management platform 102 may transmit the document package to the recipient.

FIG. 4A depicts an example mode of operation 400 in which the document management platform 102 facilitates the signing of an electronic document by configuring the requesting computing device to accept a signature. The request may originate from a link in an email or from a dashboard of an authenticated user logged into the document management platform 102. The document package in this example includes an electronic document and specifies a name of a signatory for the electronic document.

Optional branches are provided but may be entirely bypassed for certain document requestors. For instance, document signing is greatly simplified and made more efficient for a signatory having a pre-established user account which is already mapped to a public key. Document signing is simplified even more for a requestor having previously undergone third-party identity verification and consented to having their identification information stored by the document management platform 102. For example, a signatory having completed signing a first electronic document may utilize the more efficient process for signing a second electronic document. Conversely, where the document management platform 102 determines there is no user account, the document management platform 102 facilitates the creation of the user account. Where the document management platform 102 determines the user account is not mapped to a public key, the document management platform 102 maps the user account to a public key. Where the document management platform 102 determines the signatory has not undergone third party identification certification or the verified identification information is not pre-stored, the document management platform 102 routes the signatory to a third-party identity certification platform and requests consent and/or pre-authorization from the signatory to store the identification information for future use during subsequent document signing sessions.

Beginning with block 411, the document management platform 102 receives a request for a document package. The platform authentication manager 114 determines whether the request is associated with an existing user account at block 412. If the platform authentication manager 114 determines the request is not associated with an existing user account, the "NO" branch is followed to block 413 and the platform authentication manager 114 transmits instructions to the computing device requesting the document package with instructions to create the user account at block 413. Processing then returns to block 412. Conversely, if the platform authentication manager 114 determines the request is already associated with an existing user account at block 412, the "YES" branch is followed to block 414 as there is no need to create the user account.

At block 414, the platform authentication manager 114 determines whether the user account is mapped to a public key. If the platform authentication manager 114 determines the user account is not mapped to a public key at block 414, the "NO" branch is followed to block 415 and the platform authentication manager 114 maps the user account to a public key. Processing then returns to block 414. Conversely, if the platform authentication manager 114 determines the user account is already mapped to a public key at block 414, the "YES" branch is followed to block 416, as there is no need to map the user account to the public key. In some examples, where the platform authentication manager 114 determines the user account is already mapped to the public key, the platform authentication manager 114 responsively determines the public key for use in conducting a passkey challenge. In some examples, the platform authentication manager 114 initiates the passkey challenge responsive to determining the user account is mapped to a public key. For example, the platform authentication manager 114 initiates the passkey challenge using the public key.

At block 416, the platform authentication manager 114 determines whether the computing device successfully completed the passkey challenge. If no, the computing device did not successfully complete the passkey challenge, the "NO" branch is followed to block 417 and where the platform authentication manager 114 repeats the passkey challenge and processing returns to block 416. If the platform authentication manager 114 determines the computing device successfully completed the passkey challenge, the "YES" branch is followed to block 418.

At block 418, the identity verification manager 112 of the document management platform 102 evaluates whether verified identification information is pre-stored. If the verified identification information is not pre-stored, then processing follows the "NO" branch to block 419 and the signatory is routed to a third-party identity certification platform 103 to verify the signatory using valid identification (e.g., driver's license, passport, etc.). The third-party identity certification platform 103 may certify, validate, or verify the identification information and output a certified identification package 136. The certified identification package 136 may be generated as output and returned to the document management platform 102. Optionally, the identity verification manager 112 of the document management platform 102 may request the signatory's consent and/or pre-authorization to store the verified identification information for future use with signing subsequent document packages by the same signatory. For example, the signatory may sign a document in compliance with EU regulatory requirements by having their pre-stored identity information (e.g., previously certified as authentic) accessible to the document management platform and iteratively retrieved for each electronic document the signatory signs. In such a way, the signatory is not subjected to the third-party identity certification platform processing for every electronic document requiring the signatory's signature.

Conversely, if the identity verification manager 112 determines the verified identification information is pre-stored and thus accessible to the document management platform 102, the "YES" branch is followed to block 420 and the identity verification manager 112 of the document management platform 102 obtains the verified identification information. For example, the identity verification manager 112 of the document management platform 102 may obtain the certified identification package 136 from a database system into which the identification information was previously stored. Alternatively, the identity verification manager 112 of the document management platform 102 may retrieve the verified identification information from an encrypted identity wallet into which the signatory's identification information was previously stored pursuant to pre-approval and consent of the signatory to store such information.

Processing then advances to block 421 where the document management platform 102 configures the requesting computer device to accept a signature. Optionally, the document management platform 102 may pre-populate some portion of the verified identification information into the document package prior to configuring the request computing device to accept the signature.

FIG. 4B depicts another example mode of operation 401 in which the document management platform 102 facilitates the signing of a second electronic document by configuring the requesting computing device to accept a signature. The request may originate from a link in an email or from a dashboard of an authenticated user logged into the document management platform 102. The document package in this example includes an electronic document and specifies a name of a signatory for the electronic document.

In some examples, the requestor requesting the document package may have previously created a user account and the user account may already be mapped to a public key. For example, a signatory singing a second electronic document with the document management platform 102 will have previously established the user account with the document management platform 102 as part of the first electronic document signing session and the document management platform 102 would have previously mapped the public key to the user account or otherwise associated the public key with the user account. The requestor of the document package may optionally have identification information previously stored by the document management platform 102 pursuant to the requestor's pre-approval for use with future document signings.

As shown here, the platform authentication manager 114 of the document management platform 102 receives a request for a document package at block 451. At block 452, the platform authentication manager 114 determines the request is associated with an existing user account. For example, where the signatory previously created the user account with the document management platform 102.

At block 453, the platform authentication manager 114 determines the user account is mapped to a public key. For example, the public key may be stored using a database system in a record associating the user account with the public key. In such a way, the signatory is known to the document management platform 102, via the user account and the document management platform 102, in response to determining the user account is mapped to the public key, authenticates the signatory using the public key mapped to the user account. At block 454, the platform authentication manager 114 of the document management platform 102 initiates a passkey challenge to the computing device requesting the document package using the public key mapped to the user account.

At decision point 455, the platform authentication manager 114 evaluates whether the passkey challenge was successful. If the passkey challenge was not successfully completed by the computing device, the "NO" branch is followed to block 456, where the document management platform 102 denies access to the document package. In alternative examples, rather than denying access to the document package, the platform authentication manager 114 repeats initiating the passkey challenge at block 454 and repeats evaluating whether the passkey challenge was successful at decision point 455, thus permitting the requestor associated with the user account multiple attempts at successful authentication. In some examples, responsive to the platform authentication manager 114 evaluating the passkey challenge was not successful at decision point 455, rather than denying access to the document package, the platform authentication manager 114 routes the requestor to a third-party identity certification platform 103 for verifying or re-verifying the requestor's identification information. For example, if the requestor is unable to complete the passkey challenge, the platform authentication manager 114 optionally routes the signatory to the third-party identity certification platform 103, thus permitting the requestor associated with the user account to either establish their identity or to re-establish their identity.

Conversely, if the passkey challenge was successfully completed by the computing device, the "YES" branch is followed to block 457, where the document management platform 102 populates or auto-populates identification information into the document package. For example, such identification information may be stored using a database system or optionally stored in an encrypted format via an identity wallet. In response to the successful completion of the passkey challenge by the computing device, the document management platform 102 may pre-populate some or all of the identification information for the signatory into the electronic document or the document package, such that the signatory may sign the electronic document without having to manually enter their identification information into the electronic document. At block 458, processing circuitry of the document management platform 102 configures the requesting computer device to accept a signature. For example, the signatory may sign the electronic document or the document package signifying their agreement with the contents of the electronic document.

FIG. 4C depicts another example mode of operation 402 in which the document management platform 102 facilitates the signing of an electronic document by configuring the requesting computing device to accept a signature. The requestor has an option of performing a one-time signing or establishing a new user account to facilitate more efficient subsequent signings. The request may originate from a link embedded within an email or from a dashboard view of an authenticated user logged into the document management platform 102. The document package in this example includes an electronic document and specifies a name of a signatory for the electronic document.

In some examples, the requestor requesting the document package lacks a user account with the document management platform 102. Because there is no user account, there is similarly no public key associated with the user account. The document management platform may nevertheless communicate with the signatory as the document package may be configured with a name and email address for the signatory. However, where the signatory is unknown to the document management platform, further interactions with the signatory are relied upon to establish a verified and authenticated identity of the signatory.

At block 481, the document management platform 102 receives a request for a document package. At block 482, the platform authentication manager 114 of the document management platform determines the requestor is unknown to the document management platform 102. For example, the platform authentication manager 114 checks for, but determines the requestor is not associated with a user account established with the document management platform 102. Alternatively, the platform authentication manager 114 of the document management platform 102 may unsuccessfully determine any user account associated with the signatory based on the email address of the signatory, a cellular phone number of the signatory, login credentials of the signatory, or other available account authentication information.

The requestor of the document package is not obligated to create a new user account and may sign the electronic document without creating the new user account, subject to third-party identity verification. In some examples, the requestor of the document package is presented with an option of performing either a one-time signing of the electronic document within the document package or creating a new user account via which to sign the electronic document within the document package and for use with signing additional documents in a more efficient manner. A requestor selecting the one-time signing process may utilize the one-time signing process for multiple document packages, however, that requestor will be subjected to third-party identity verification for each of those document package signings. Conversely, a requestor that creates a new user account which is mapped to a public key and has undergone third-party identity verification and consented to having their identification information saved by the document management platform 102 may utilize the more efficient signing process for subsequent signing sessions. For example, the same requestor signing a second electronic document may consent to having the document management platform retrieve and re-use their identification information without undergoing the third-party identity verification procedures to sign the second electronic document or to sign multiple electronic documents across multiple signing sessions. However, the third-party identity verification process is relied upon at least once, as is depicted here.

At decision point 483, the platform authentication manager 114 of the document management platform 102 determines whether the requestor elects to utilize the one-time signing process or to establish a new user account. For instance, the platform authentication manager 114 may present an option to the requestor, such as outputting selectable options to the requestor via a graphical user interface (GUI) transmitted to the computing device from which the request for the document package originated. In some examples, a requestor that is determined to be unknown to the document management platform 102 by the platform authentication manager 114 at block 482 will automatically be presented with the option of creating a new user account. The requestor may always decline to create a new user account as a user account is not required by the document management platform for signing the electronic document. However, third-party identity verification is required in certain jurisdictions.

At decision point 483, if the requestor elects to create a new user account, the "NEW ACCOUNT" branch is followed to block 484, where the platform authentication manager 114 creates the new user account on behalf of the requestor. For example, the platform authentication manager 114 may transmit instructions to the requestor for creating the new user account and based on input received by the platform authentication manager 114 from the requestor, the platform authentication manager 114 creates the new user account.

Following the "NEW ACCOUNT" branch processing, at block 485, the platform authentication manager 114 maps the new user account to a public key. In some examples, the platform authentication manager 114 performs the mapping by recording an association between the public key and the user account using a database system. The platform authentication manager 114 may additionally transmit instructions to the computing device having originated the request for the document package and used by the signatory to create a private key for use in completing a passkey challenge with the platform authentication manager 114. Mapping the new user account to the public key need only be performed a single time for each user account. In some examples, because the requestor was previously unknown to the document management platform 102 and because the passkey challenge relies on the use of the public key, platform authentication manager 114 will map the new user account to a public key as shown at block 484 in response to creating the new user account 483.

At block 486, the platform authentication manager 114 initiates a passkey challenge using the public key mapped to the user account. At decision point 487, the platform authentication manager 114 evaluates whether or not the passkey challenge was successfully completed by the computing device. If the passkey challenge was not successfully completed, then the "NO" branch is followed and at block 488, the document management platform 102 denies access. Alternatively, the platform authentication manager 114 may repeat initiating the passkey challenge or undertake alternative procedures to authenticate the user account.

Subsequent signing sessions may bypass the user account creation and public key mapping operations, for example, by following the primary (left) branch of processing as set forth at FIG. 4A at block 411 and bypass each of blocks 413, 415, and 417, after the new user account has been established, correctly mapped to a public key, and the requestor of the document package has successfully participated in and successfully completed the passkey challenge.

With reference to decision point 487 of FIG. 4C, if the passkey challenge is successful, the "YES" branch is followed and at block 489 the identity verification manager 112 of the document management platform routes the signatory to a third-party identity certification platform 103 to verify the signatory using valid identification (e.g., driver's license, passport, etc.). The third-party identity certification platform 103 may certify, validate, or verify the identification information and output a certified identification package 136 as discussed above.

Both the "NEW ACCOUNT" branch and the "ONE-TIME" branch merge at block 489 as both modes of operation flow through block 489 where the identity verification manager 112 routes the signatory the third-party identity certification platform 103.

At block 490, the identity verification manager 112 of the document management platform 102 obtains the identification information. In some examples, the identity verification manager 112 receives as input the certified identification package 136 from the third-party identity certification platform 103.

At block 491 the document management platform 102 configures the requesting computer device to accept a signature. Optionally, the document management platform 102 may pre-populate some portion of the verified identification information into the document package prior to configuring the request computing device to accept the signature.

In such a way, the requestor may complete the signing of the electronic document within the document package requested following the "NEW ACCOUNT" process.

Alternatively, a requestor may complete the signing of the electronic document within the document package requested without creating a new user account by following the "ONE-TIME" process. For example, returning to decision point 483, if the requestor elects to use the one-time process, then a new user account is not created, and the "ONE-TIME" branch is followed to block 489. At block 489, the identity verification manager 112 of the document management platform routes the signatory to a third-party identity certification platform 103 to verify the signatory using valid identification (e.g., driver's license, passport, etc.). As with the "NEW ACCOUNT" process, the third-party identity certification platform 103 may certify, validate, or verify the identification information and output a certified identification package 136. Merging the "NEW ACCOUNT" branch and the "ONE-TIME" branch block 489, processing advances to block 490 where the identity verification manager 112 of the document management platform 102 obtains the identification information.

At block 491 the document management platform 102 configures the requesting computer device to accept a signature without having created the new user account. Optionally, the document management platform 102 may pre-populate some portion of the verified identification information into the document package prior to configuring the request computing device to accept the signature.

According to another example, there is non-transitory computer readable storage media having instructions stored thereupon, that, when executed, configure processing circuitry of a computing system to: receive, by processing circuitry, a request from a computing device for a document package, in which the document package includes an electronic document and specifies a name of a signatory for the electronic document. In response to a determination that the request is associated with a user account, the processing circuitry may initiate a passkey challenge to the computing device using a public key associated with the user account. Responsive to successful completion of the passkey challenge, the processing circuitry may configure the computing device to accept a signature corresponding to the name of the signatory specified for the electronic document.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with the examples of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

What is claimed is:

1. A method comprising:
   receiving, by a platform authentication manager using processing circuitry, a request from a computing device for a document package, wherein the document package includes an electronic document and specifies a name of a signatory for the electronic document;
   in response to determining, by the platform authentication manager, that the request is associated with a user account, initiating, by the platform authentication manager, a passkey challenge to the computing device, wherein the passkey challenge comprises:
      retrieving a public key from an identity wallet associated with the user account; and
      generating, using the public key, an encrypted data block from a challenge input and outputting the encrypted data block to the computing device; and
   based on determining that a response received from the computing device includes a recovered block of data that corresponds to the challenge input, configuring, by the platform authentication manager, the computing device to accept a document signature corresponding to the name of the signatory specified for the electronic document.

2. The method of claim 1, further comprising:
   transmitting, by the platform authentication manager, instructions to issue a challenge for biometric authentication input to the computing device;
   receiving, by the platform authentication manager, from the computing device, a successful response to the challenge for biometric authentication input; and
   determining, by the platform authentication manager, that the request is associated with the user account responsive to receiving the successful response to the challenge for biometric authentication input.

3. The method of claim 2, wherein transmitting the instructions to issue the challenge for the biometric authentication input comprises:
   transmitting the instructions to the computing device to obtain the biometric authentication input using native biometric challenge functionality of a web-browser executing at the computing device; and
   wherein the challenge for biometric authentication input uses a biometric user interface to unlock the computing device.

4. The method of claim 1, further comprising:
transmitting, by the platform authentication manager to the computing device, an authentication request for a one-time use two-factor identification (2FA) code;
obtaining, by the platform authentication manager from the computing device, the one-time use 2FA code; and
determining, by the platform authentication manager that the request is associated with the user account based on the one-time use 2FA code obtained from the computing device.

5. The method of claim 1, further comprising:
responsive to receiving the request from the computing device for the document package, determining, by the processing circuitry, the request from the computing device is associated with the signatory specified for the electronic document, by at least one of:
receiving, by the platform authentication manager, the request from the computing device to view the electronic document via an embedded email link opened at the computing device; or
receiving, by the platform authentication manager, the request from the computing device to view the electronic document via an authenticated platform session established with the computing device.

6. The method of claim 1, wherein configuring the computing device to accept the document signature corresponding to the name of the signatory specified for the electronic document comprises:
decrypting, by a cryptographic engine using the processing circuitry and outputting to the platform authentication manager, identification information from the identity wallet associated with the user account for identity verification of the signatory; and
automatically populating, by the platform authentication manager, at least a portion of the identification information decrypted from the identity wallet associated with the signatory into the electronic document prior to configuring the computing device to accept the document signature.

7. The method of claim 1, further comprising:
storing, by an identity verification manager using the processing circuitry, the public key into the identity wallet;
recording, by the identity verification manager to the the identity wallet, a mapping between the public key and the user account; and
determining, by the platform authentication manager, that the public key is associated with the user account based on the mapping between the public key and the user account recorded to the identity wallet.

8. The method of claim 1, further comprising:
receiving, by the platform authentication manager, the response including the recovered block of data, wherein the computing device is configured to decrypt the recovered block of data from the encrypted data block using a private key; and
determining, by the platform authentication manager, the recovered block of data corresponds to the challenge input based on a comparison of the recovered block of data with the challenge input.

9. The method of claim 1, wherein the passkey challenge comprises: a password-less authentication, by the platform authentication manager, of the signatory for the electronic document.

10. The method of claim 1, wherein initiating the passkey challenge to the computing device using the public key associated with the user account comprises at least one of:

applying a Public Key Infrastructure (PKI) compliant process for authenticating the computing device;
using a Fast Identity Online (FIDO) compliant private key storage protocol for authenticating the computing device;
using a private key storage device communicatively interfaced with the computing device for authenticating the computing device;
using a secure digital wallet accessible to the signatory specified by the document package for authenticating the computing device; or
using a private key imported by the computing device from a second computing device associated with the signatory for authenticating the computing device.

11. The method of claim 1, wherein the processing circuitry implements a document management platform; and
prior to determining that the request received from the computing device for the document package is associated with the user account, the method further includes:
determining, by the platform authentication manager of the document management platform, the signatory for the electronic document has not yet established the user account with the document management platform; and
outputting, by the platform authentication manager, instructions to the computing device to instruct the signatory for the electronic document to create the user account with the document management platform.

12. The method of claim 1, wherein the processing circuitry implements a document management platform, the method further comprising, prior to determining that the request received from the computing device for the document package is associated with the user account:
obtaining, by an identity verification manager of the document management platform, pre-authorization from the signatory for the electronic document to store identification information about the signatory for the electronic document at the document management platform.

13. The method of claim 12, further comprising:
responsive to obtaining the pre-authorization from the signatory for the electronic document to store the identification information about the signatory for the electronic document at the document management platform:
creating, by the identity verification manager, an identity wallet associated with the user account at the document management platform; and
encrypting, by a cryptographic engine of the document management platform, the identification information about the signatory for the electronic document within the identity wallet associated with the user account in an encrypted format.

14. The method of claim 12, further comprising:
outputting, by the platform authentication manager to the computing device, instructions for creating and storing a private key at the computing device to respond to the passkey challenge; and
subsequent to the determining that the response received from the computing device includes the recovered block of data that corresponds to the challenge input and based on the document management platform having the pre-authorization from the signatory for the electronic document to store the identification information about the signatory for the electronic document at the document management platform, the method further includes:

decrypting, by a cryptographic engine of the document management platform, the identification information about the signatory for the electronic document stored at the document management platform using the public key associated with the user account.

15. The method of claim 1, further comprising:
prior to receiving the request for the document package, directing, by the platform authentication manager, the computing device to a third-party identity certification platform to capture identification information of the signatory for the electronic document.

16. The method of claim 15, further comprising:
obtaining, by an identity verification manager from the third-party identity certification platform, a data package specifying the identification information of the signatory for the electronic document;
obtaining, by the identity verification manager, pre-authorization from the signatory for the electronic document to store the identification information; and
storing, by the identity verification manager, the identification information of the signatory for the electronic document within the identity wallet using an encrypted format.

17. The method of claim 15, wherein directing the computing device to the third-party identity certification platform comprises requesting, by the platform authentication manager, the third-party identity certification platform to independently perform identity verification operations for the signatory.

18. The method of claim 1:
wherein the processing circuitry implements a document management platform;
wherein the computing device is a first computing device; and
wherein the method further comprises:
creating, by the document management platform, the document package using at least the electronic document as received from a second computing device and the name of the signatory as specified by the second computing device; and
outputting, from the document management platform to the first computing device, a notification indicating the electronic document is ready to be signed.

19. A system, comprising:
processing circuitry;
non-transitory computer readable media comprising a platform authentication manager executable by the processing circuitry; and
wherein the platform authentication manager is configured to:
receive a request from a computing device for a document package, wherein the document package includes an electronic document and specifies a name of a signatory for the electronic document;
wherein the platform authentication manager is configured to, in response to a determination that the request is associated with a user account, initiate a passkey challenge to the computing device, wherein the passkey challenge comprises:
retrieval of, a public key from an identity wallet associated with the user account;
generation, using the public key, of an encrypted data block from a challenge input and output the encrypted data block to the computing device; and
based on a determination that a response received from the computing device includes a recovered block of data that corresponds to the challenge input, configure the computing device to accept a document signature corresponding to the name of the signatory specified for the electronic document.

20. Computer-readable storage media comprising instructions that, when executed, configure a platform authentication manager using processing circuitry to:
receive a request from a computing device for a document package, wherein the document package includes an electronic document and specifies a name of a signatory for the electronic document;
in response to a determination that the request is associated with a user account, initiate a passkey challenge to the computing device, wherein the passkey challenge comprises:
retrieval of a public key from an identity wallet associated with the user account; and
generation, using the public key, of an encrypted data block from a challenge input and outputting the encrypted data block to the computing device; and
based on a determination that a response received from the computing device includes a recovered block of data that corresponds to the challenge input, configure the computing device to accept a document signature corresponding to the name of the signatory specified for the electronic document.

* * * * *